(12) United States Patent
Satake et al.

(10) Patent No.: US 7,273,165 B2
(45) Date of Patent: Sep. 25, 2007

(54) PRINTING SYSTEM

(75) Inventors: Masato Satake, Otsu (JP); Jun Inagaki, Otsu (JP); Hideaki Sugio, Otsu (JP); Ryoji Shimazu, Otsu (JP); Yasuhisa Mizuno, Otsu (JP)

(73) Assignee: Toray Engineering Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 11/345,231

(22) Filed: Feb. 2, 2006

(65) Prior Publication Data
US 2006/0124723 A1 Jun. 15, 2006

Related U.S. Application Data

(62) Division of application No. 10/995,270, filed on Nov. 24, 2004.

(30) Foreign Application Priority Data

Nov. 28, 2003 (JP) .............................. 2003-399041
Oct. 22, 2004 (JP) .............................. 2004-307840

(51) Int. Cl.
*G06F 17/00* (2006.01)
*G06K 7/10* (2006.01)
*H04Q 5/22* (2006.01)
*G08B 13/14* (2006.01)
*G03G 15/00* (2006.01)

(52) U.S. Cl. .............. 235/375; 235/472.02; 340/572.1; 340/10.1; 399/1; 347/14; 400/76

(58) Field of Classification Search ................ 235/375, 235/472.02, 487; 340/572.1, 10; 347/14; 400/76; 399/1
See application file for complete search history.

(56) References Cited

U.S. PATENT DOCUMENTS

| | | | |
|---|---|---|---|
| 5,560,970 A | | 10/1996 | Ludebuhl |
| 5,660,663 A | * | 8/1997 | Chamberlain et al. ...... 156/152 |
| 5,724,085 A | | 3/1998 | Inui et al. |
| 5,867,102 A | * | 2/1999 | Souder et al. ........... 340/572.8 |
| 5,982,284 A | | 11/1999 | Baldwin et al. |
| 5,986,682 A | | 11/1999 | Itou |
| 6,019,865 A | * | 2/2000 | Palmer et al. ............. 156/265 |
| 6,123,796 A | * | 9/2000 | Kathmann et al. .......... 156/249 |
| 6,246,326 B1 | * | 6/2001 | Wiklof et al. ............ 340/572.1 |
| 6,278,472 B1 | | 8/2001 | Sasaki et al. |
| 6,280,544 B1 | * | 8/2001 | Fox et al. ..................... 156/64 |
| 6,327,972 B2 | * | 12/2001 | Heredia et al. ............... 101/35 |

(Continued)

FOREIGN PATENT DOCUMENTS

JP 11-353435 A 12/1999

(Continued)

*Primary Examiner*—Daniel Walsh
(74) *Attorney, Agent, or Firm*—Birch, Stewart, Kolasch & Birch, LLP

(57) ABSTRACT

A printing system capable of writing RFID data consistent with print information printed on a print-information recoding medium into an RFID chip carried on the print-information recording medium. The printing system includes a printer engine for printing print information, including at least either one of contactlessly readable information and image information visible to human being, onto at least the print-information recording medium, and an RFID reader/writer for writing RFID data consistent with the print information into the RFID chip carried on the print-information recording medium.

13 Claims, 15 Drawing Sheets

U.S. PATENT DOCUMENTS

| | | |
|---|---|---|
| 6,369,711 B1 | 4/2002 | Adams et al. |
| 6,409,401 B1* | 6/2002 | Petteruti et al. ............... 400/88 |
| 6,429,888 B1 | 8/2002 | Taki et al. |
| 6,451,154 B1* | 9/2002 | Grabau et al. ............... 156/300 |
| 6,593,853 B1* | 7/2003 | Barrett et al. ............ 340/572.1 |
| 6,899,476 B1* | 5/2005 | Barrus et al. ................. 400/76 |
| 6,929,412 B1* | 8/2005 | Barrus et al. ................. 400/76 |
| 7,037,009 B2* | 5/2006 | Barrus et al. ................. 400/76 |
| 7,066,667 B2* | 6/2006 | Chapman et al. ............. 400/76 |
| 7,073,712 B2* | 7/2006 | Jusas et al. .................. 235/451 |
| 7,112,001 B2* | 9/2006 | Hohberger et al. ......... 400/611 |
| 2004/0044956 A1* | 3/2004 | Huang ........................ 715/511 |
| 2004/0125161 A1* | 7/2004 | Huffman ........................ 347/14 |
| 2004/0159709 A1* | 8/2004 | Ohta et al. .................. 235/492 |
| 2004/0169086 A1* | 9/2004 | Ohta et al. .................. 235/492 |
| 2004/0257203 A1* | 12/2004 | Maltsev et al. ............ 340/10.1 |
| 2005/0029350 A1* | 2/2005 | Jusas et al. .................. 235/451 |
| 2005/0058483 A1* | 3/2005 | Chapman et al. ............. 400/76 |
| 2005/0139667 A1* | 6/2005 | Barrus et al. ............... 235/432 |
| 2005/0174240 A1* | 8/2005 | Vogt ........................ 340/572.8 |
| 2005/0218219 A1* | 10/2005 | Sano et al. .................. 235/383 |
| 2005/0252968 A1* | 11/2005 | Tsujimura et al. ........... 235/439 |
| 2006/0029399 A1* | 2/2006 | Park et al. ..................... 399/12 |
| 2006/0071063 A1* | 4/2006 | Duckett ...................... 235/375 |
| 2006/0104689 A1* | 5/2006 | Marowski et al. ............ 400/76 |
| 2006/0127154 A1* | 6/2006 | Barrus et al. ................. 400/76 |
| 2006/0164447 A1* | 7/2006 | Poole et al. .................... 347/5 |
| 2006/0171753 A1* | 8/2006 | Fessler et al. ................. 400/76 |
| 2007/0013520 A1* | 1/2007 | Conwell et al. ......... 340/572.1 |
| 2007/0014615 A1* | 1/2007 | Kasayama et al. ............ 400/76 |
| 2007/0018785 A1* | 1/2007 | Chi ............................ 340/5.2 |
| 2007/0023516 A1* | 2/2007 | Chapman et al. ........... 235/432 |
| 2007/0036599 A1* | 2/2007 | Piersol et al. ................. 400/76 |
| 2007/0068404 A1* | 3/2007 | Hirahara et al. ............. 101/141 |

FOREIGN PATENT DOCUMENTS

| | | |
|---|---|---|
| JP | 2003-231285 A | 8/2003 |
| JP | 2005-96145 A | 4/2005 |

* cited by examiner

FIG. 4

| | SENDER'S INFORMATION | | | |
|---|---|---|---|---|
| DATA ID | ZIP | ADDRESS | NAME | PHONE NUMBER |
| 00001 | 520-2141 | OOTSU OOE X-X | TORAY | XX-XXX-XXXX |
| 00002 | 520-2141 | OOTSU OOE X-X | TORAY | XX-XXX-XXXX |
| 00003 | 520-2141 | OOTSU OOE X-X | TORAY | XX-XXX-XXXX |
| 00004 | 520-2141 | OOTSU OOE X-X | TORAY | XX-XXX-XXXX |

| RECEIPANT'S INFORMATION | | | |
|---|---|---|---|
| ZIP | ADDRESS | NAME | PHONE NUMBER |
| 103-0021 | TOKYO, CHUO-KU,NIHONBASHI X-X | TORAY | 03-XXX-XXXX |
| 103-0021 | TOKYO, CHUO-KU,NIHONBASHI X-X | TORAY | 03-XXX-XXXX |
| 530-0005 | OSAKA, KITA-KU,NAKANOSHIMA X-X | TORAY | 06-XXX-XXXX |
| 530-0005 | OSAKA, KITA-KU,NAKANOSHIMA X-X | TORAY | 06-XXX-XXXX |

| DISTRIBUTION INFORMATION | | | GOODS INFORMATION |
|---|---|---|---|
| SHIPPING STORE CODE | ARRIVAL STORE CODE | INQUIRY NUMBER | WEIGHT |
| XXXXX-XX | XXXXX-XX | XXXX-XXX-XX | x kg |
| XXXXX-XX | XXXXX-XX | XXXX-XXX-XX | x kg |
| XXXXX-XX | XXXXX-XX | XXXX-XXX-XX | x kg |
| XXXXX-XX | XXXXX-XX | XXXX-XXX-XX | x kg |

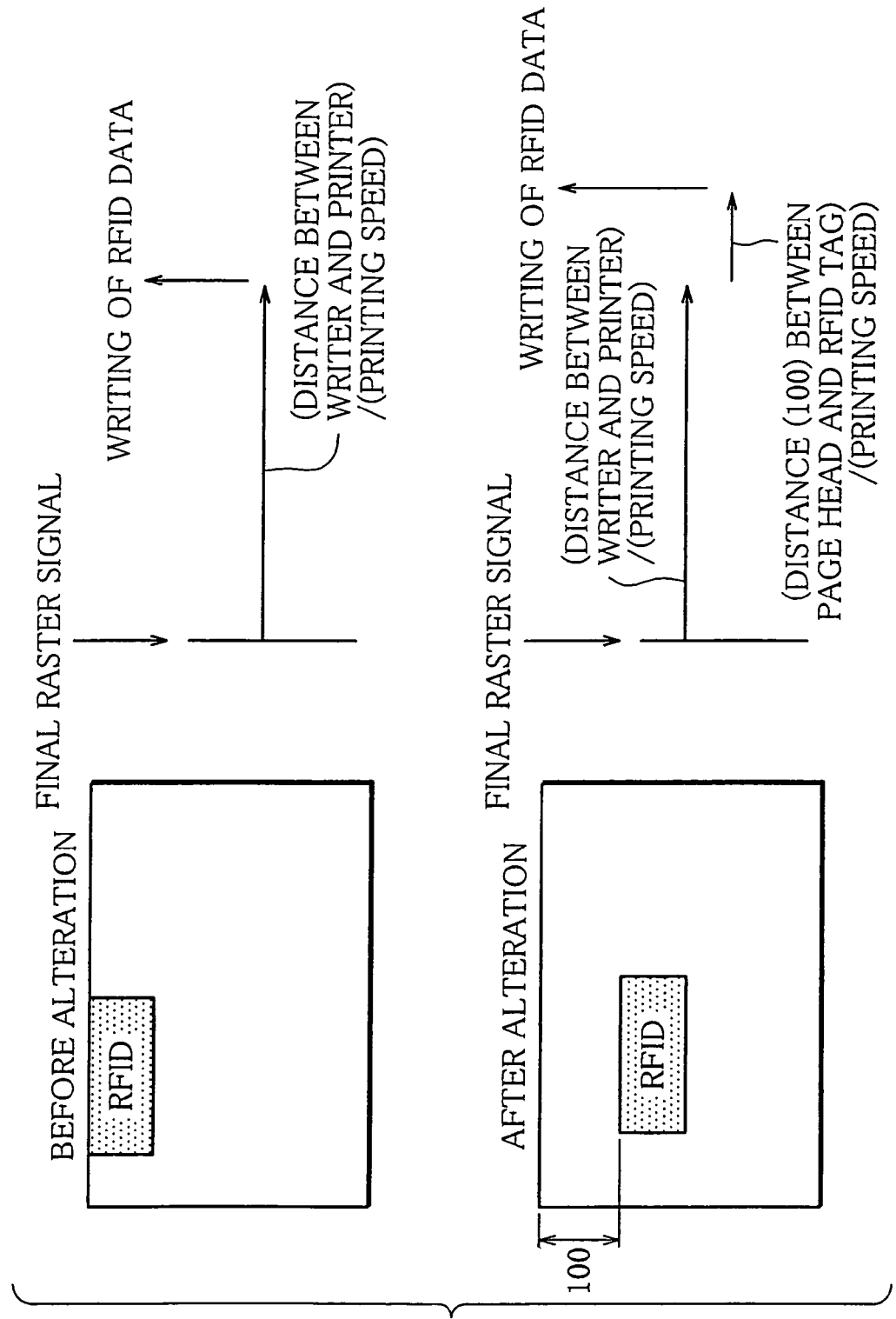

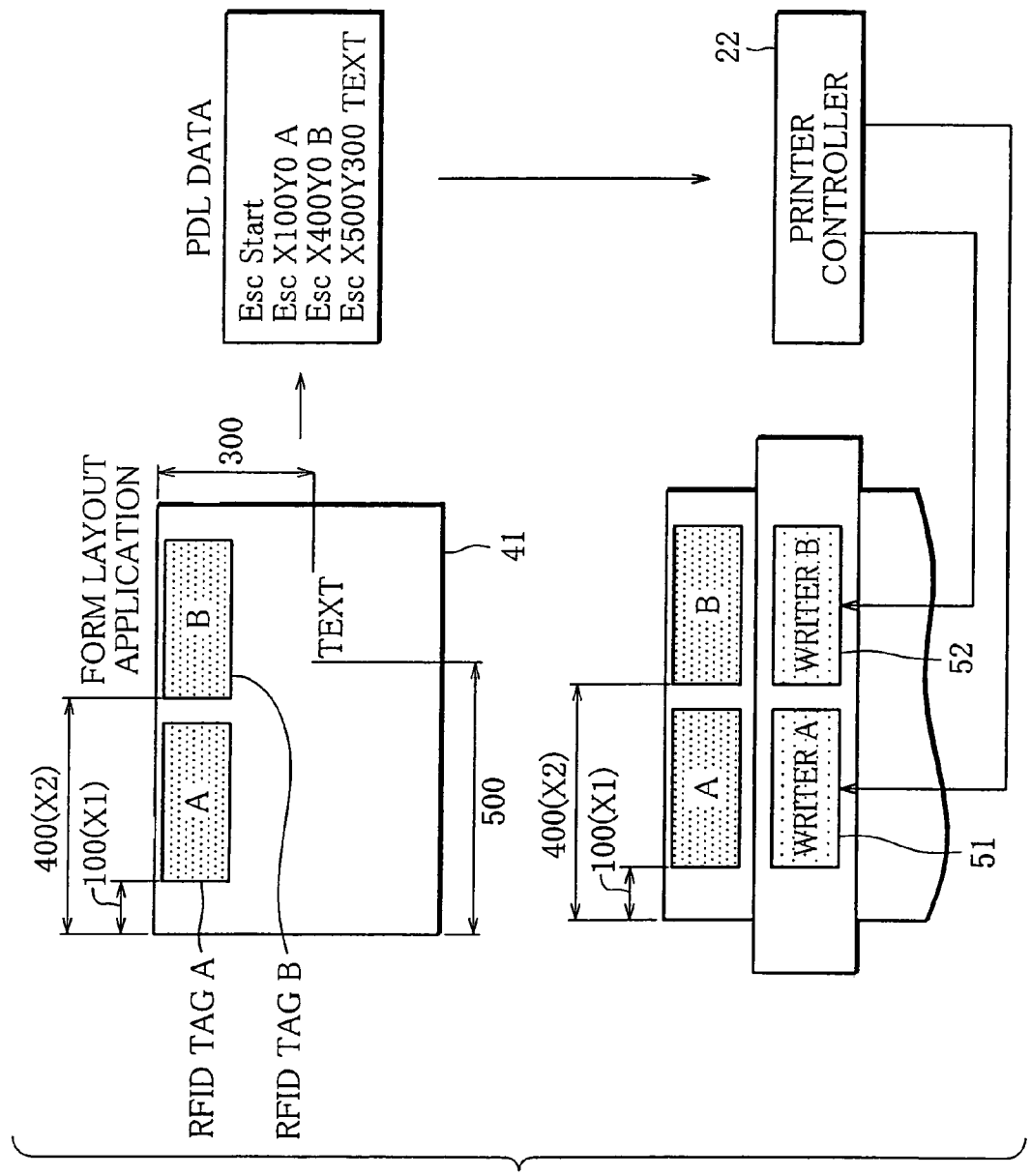

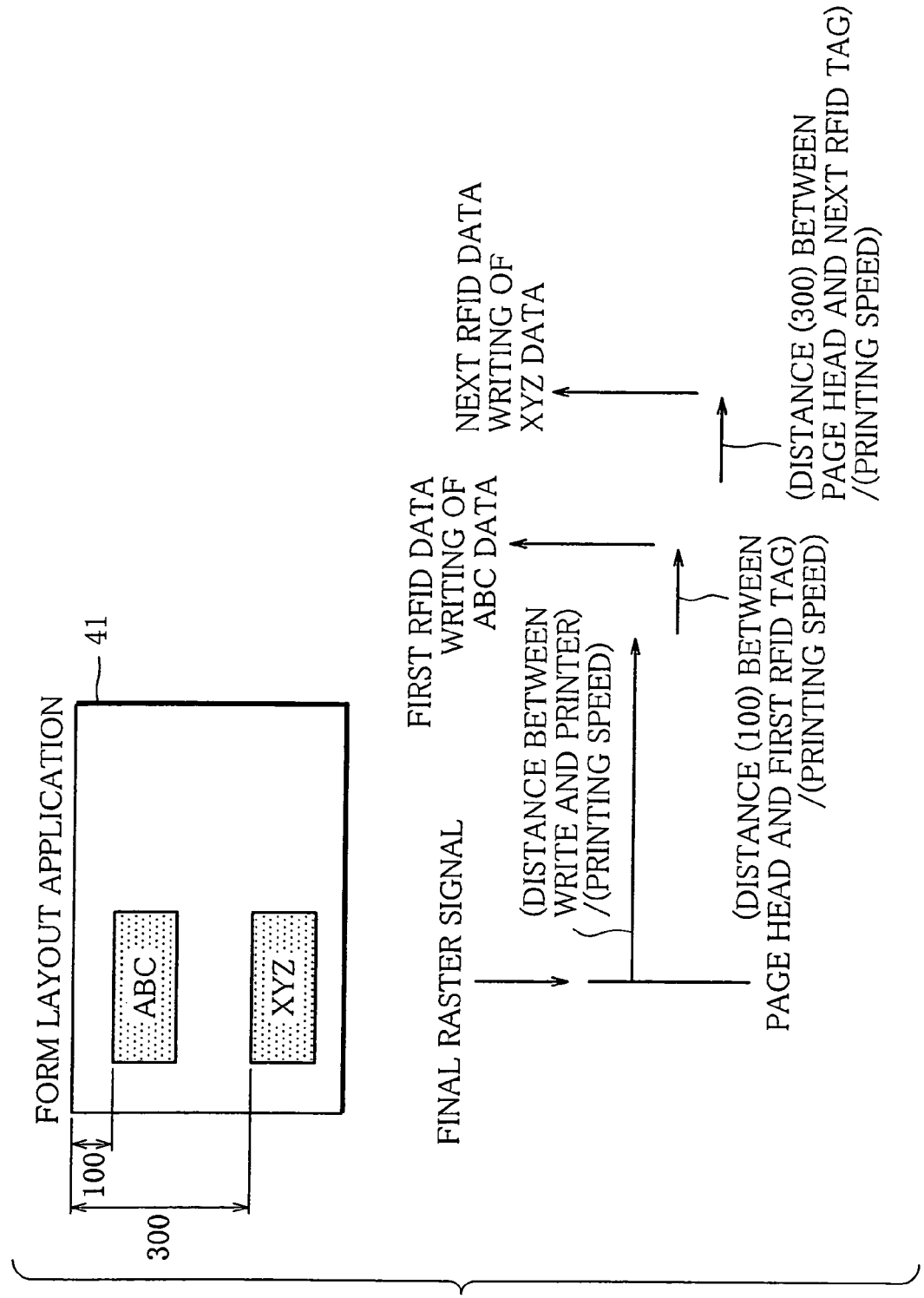

PRINTING SYSTEM

CROSS-REFERENCE TO RELATED APPLICATIONS

This application is a Divisional of co-pending application Ser. No. 10/995,270, filed on Nov. 24, 2004, the entire contents of which are hereby incorporated by reference and for which priority is claimed under 35 U.S.C. § 120.

BACKGROUND OF THE INVENTION

1. Field of the Invention

This invention relates to a printing system for printing print information on a print-information recording medium and for writing electronic information into an electronic-information recording medium carried on the print-information recording medium, and more particularly, to a printing system capable of writing electronic information into an electronic-information recording medium in a manner consistent with print information including at least either one of contactlessly readable code information and image information visible to human being.

2. Description of the Related Art

Instead of a conventional information recording medium such as a magnetic card and a contact-type IC card, an information recording medium (hereinafter referred to as RFID tag) has been developed, which is comprised of a print-information recording medium and an electronic-information recording medium (hereinafter referred to as RFID chip) such as IC chip, and in which the electronic-information recording medium is carried on the print-information recording medium and is adapted to allow electronic information to be contactlessly read therefrom and written thereto. Thus, the RFID tag can eliminate the necessity of being kept in contact with a readout/write device at the time of electronic information being read from and written into the RFID tag, and therefore, the RFID tag is especially expected as an alternative to a bar code that is used in distribution management (see for example, Japanese unexamined patent publication no. 11-353435).

The bar code conventionally used for distribution management is adapted to be read by use of a special-purpose device, and therefore, the bar code content cannot generally immediately be recognized by human being by glancing at the bar code. In this regard, image information (character information and/or symbolic information) which is visible to and whose content is understandable to human being (hereinafter referred to as "image information visible to human being") is sometimes printed at the same time when the bar code is printed.

The printing of bar code and the printing of image information visible to human being can be made by using the same printing system, and hence it is relatively easy to ensure the consistency between information given by a bar code and image information visible to human being. On the other hand, the writing of electronic information (hereinafter referred to as RFID data) into the RFID chip is performed by use of a device different from a device for printing image information visible to human being. Moreover, according to the prior art, in most cases, different applications are used for preparation, edition, and management of print data of image information visible to human being and of RFID data written into the RFID tag. This makes it difficult to ensure the consistency between the RFID data (electronic information) to be written into the RFID tag and the image information printed thereon.

To print the image information visible to human being onto the print-information recording medium of the RFID tag, a laser printer or the like is ordinarily used. A mainstream laser printer or the like employs a high temperature roller that is adapted to be in contact with the print-information recording medium in order to fix toner to the recording medium. Due to the presence of the high temperature roller, there is a fear that the RFID tag may be damaged.

In an existing printer engine or the like that is used to print the image information visible to human being, the print-information recording medium is often bent therein. Therefore, the RFID tag, especially the RFID chip carried on the print-information recording medium, can be damaged due to the bending of the recording medium.

SUMMARY OF THE INVENTION

The present invention provides a printing system that is capable of writing RFID data (electronic information) consistent with print information printed on a print-information recoding medium into an RFID chip (electronic-information recording medium) carried on the print-information recording medium.

A printing system of this invention comprises a printer engine for printing print information on at least a print-information recording medium, said print information including at least one of contactlessly readable information and image information visible to human being, and an RFID reader/writer for writing RFID data consistent with the print information into an RFID chip carried on the print-information recording medium.

According to the printing system of this invention, an RFID tag can be prepared, without causing inconsistency between print information printed on the print-information recording medium (or printed on both the print-information recording medium and the RFID chip carried thereon) and the RFID data (electronic information) written into the RFID chip.

The printing system of this invention may further comprise optical readout means for contactlessly reading the code information. In this invention, the printer engine prints at least the code information on at least the print-information recording medium, and the RFID reader/writer writes the RFID data into the RFID chip based on the code information read by the optical readout means. According to this invention, the RFID data consistent with the code information printed on the print-information recording medium can be written into the RFID chip.

In another invention, the RFID reader/writer reads the RFID data written into the RFID chip, and the printer engine prints the print information on at least the print-information recording medium based on the RFID data read by the RFID reader/writer. According to this invention, the print information consistent with the RFID data written into the RFID chip can be printed on the print-information recording medium.

Preferably, the printer engine prints the code information and the image information consistent therewith on at least the print-information recording medium. In this case, both the code information and the image information are printed, serving as print information, onto at least the print-information recording medium. More preferably, the printer engine prints a bar code on at least the print-information recording medium, said bar code providing information that constitutes at least part of the code information. In this case, the bar code is printed as the code information on the print-information recording medium.

Preferably, the printing system comprises a plurality of RFID readers/writers, and these RFID readers/writers write the RFID data into the RFID chip. According to this invention, the RFID chip may have a storage region that is divided into a plurality of areas, so that each area may be written with a corresponding part of the RFID data by means of a corresponding one of the plurality of the RFID readers/writers. This makes it possible to write the RFID data into the RFID chip with reliability, even if the printing system is high in printing speed.

Alternatively, the printing system may comprise a plurality of RFID readers/writers and a plurality of RFID chips. Each of the RFID readers/writers writes the RFID data into a corresponding one of the plurality of RFID chips, and the plurality of RFID readers/writers perform writings nearly simultaneously. According to this invention, the writing of the RFID data into the RFID chips can be efficiently and reliably performed by means of the RFID readers/writers.

The printing system of this invention may further comprise a printer controller for supplying print data. In this invention, the printer engine prints the print information on at least the print-information recording medium based on the print data received from the printer controller, and the RFID reader/writer writes the RFID data consistent with the print data into the RFID chip. According to this invention, the print information and the RFID data are each consistent with the print data, whereby not only the print information and the RFID data can be made consistent with each other, but also both the printing of the printing information and the writing of the RFID data can be carried out by means of a single printing system.

Preferably, the printing of the print information on at least the print-information recording medium based on the print data and the writing of the RFID data consistent with the print data into the RFID chip are controlled based on a common time basis. More preferably, the printer engine performs page-based printing, and the common time basis is based on a cycle of the page-based printing of the printer engine. According to this invention, it is possible to make the print information and the RFID data consistent with each other with reliability.

Preferably, the printing system of this invention further comprises a form layout application program capable of editing both the print data and the RFID data. In this case, not only the editing of the print data and the RFID data can be efficiently carried out, but also the data editing as well as both the printing and the RFID data writing based on the edited data can be carried out by means of a single printing system. This is efficient. More preferably, at least part of the RFID data is transmitted in the form of PDL (page description language) data from the form layout application program to the printer controller.

It is preferable that the printer controller or the form layout application program is capable of recording or displaying information that indicates whether or not the RFID reader/writer can write the RFID data into the RFID chip, and it is also preferable that the form layout application program is capable of specifying error processing in the printer controller. According to this invention, the data writing can reliably be carried out, with the RFID reader/writer ready for data writing. When there occurs an error, an appropriate countermeasure such as printing stoppage can be made and an operator can be notified of the occurrence of error.

It is preferable that the printer controller or the form layout application program is capable of displaying an edit screen for the print data, and that the RFID data can be displayed on the edit screen. This aspect of the invention makes it easy for an operator to perform data editing.

Preferably, the form layout application program can specify position information on a location of the RFID data in one page of the print-information recording medium. With this aspect of the invention, it is possible to appropriately perform the writing of the RFID data into the RFID chip that is carried on the print-information recording medium at an arbitrary position.

Preferably, the printer system is capable of referring to a database, and a database address serving as at least either one of the print data and the RFID data can be edited in the form layout application program. According to this aspect of the invention, an amount of data transmitted from the form layout application program to the printer controller can be reduced, and the RFID data can be altered by altering the content of the database.

In the printing system, a plurality of RFID readers/writers may be provided so as to be juxtaposed in a width direction of the print-information recording medium, and a plurality of RFID chips may be carried on the print-information recording medium so as to be juxtaposed in a width direction of the print-information recording medium. Each of the RFID readers/writers writes the RFID data into a corresponding one of the RFID chips, and the RFID readers/writers perform the writings nearly simultaneously. According to this aspect of the invention, the writing of the RFID data into the RFID chips can be made appropriately and efficiently.

In the printing system, a plurality of RFID chips may be carried on one page of the print-information recording medium as viewed in a direction of transfer of the recording medium. The RFID reader/writer sequentially writes the RFID data into each of the RFID chips. With this aspect of the invention, the writing of the RFID data into the RFID chips can be made with use of a single RFID reader/writer.

It is preferable that a printing speed of the printer engine can be changed in accordance with an amount of information of the RFID data. With this aspect of the invention, the consistency between print information and RFID data can be ensured without regard to the printing speed.

In the printing system, a print face of the print-information recording medium on which the print information is printed may have a level difference, and the print information may be printed on a substantially flat portion of the print face, avoiding the level difference. With this aspect of the invention, the print information can be printed appropriately, even if the print face has such a level difference.

The printing system of this invention may further comprise fixing means disposed out of contact with the print-information recoding medium carrying the RFID chip, transfer means for substantially linearly transferring the print-information recording medium carrying the RFID chip, and cooling means for cooling at least either one of the print-information recording medium carrying the RFID chip and the transfer means. In this invention, the RFID tag (the print-information recording medium on which the RFID chip is carried) is transferred substantially linearly, and thus the RFID tag is not bent, making it possible to prevent the RFID tag, especially, the RFID chip from being damaged. Furthermore, since the print-information recording medium or the transfer means is cooled, the temperature of the RFID tag, especially, the temperature of the RFID chip, can be suppressed from being raised, making it possible to prevent the RFID chip from being damaged. Preferably, the printer engine is electrographic type, and the fixing means is flash fixing type. By adopting the fixing means of flash-fixing type, a temperature rise in the RFID tag can be suppressed, and the RFID chip can be prevented from being damaged.

BRIEF DESCRIPTION OF THE DRAWINGS

The present invention will become more fully understood from the detailed description given herein below and the accompanying drawings which are given by way of illustration only, and thus, are not limitative of the present invention, and wherein:

FIG. 4 is a view showing an example of a database used in the first embodiment;

FIG. 17 is a view showing data writing in the fourth embodiment into an RFID chip carried on a print-information recording medium at an arbitrary position as viewed in a transfer direction of the recording medium;

FIG. 18 is a view showing data writing in the fourth embodiment into a plurality of RFID chips that are carried on the print-information recording medium so as to be juxtaposed in a width direction of the recording medium; and FIG. 19 is a view showing data writing in the fourth embodiment into a plurality of RFID chips that are carried on the print-information recording medium so as to be juxtaposed in a transfer direction of the recording medium.

DETAILED DESCRIPTION OF THE INVENTION

With reference to FIGS. 1-7, a printing system according to a first embodiment of this invention will be explained. This printing system is suitable for preparation of packing slips for home delivery service that are used at the time of delivery of goods in large quantity from a department store or a mail-order selling company.

Figure 1:
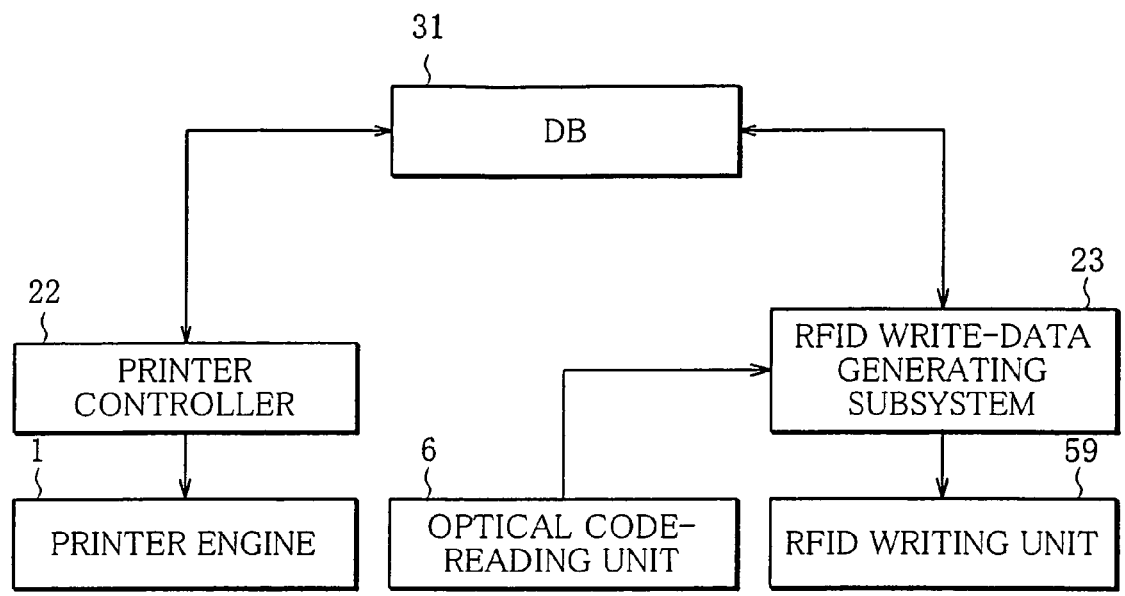
FIG. 1 is a block diagram showing a printing system according to a first embodiment of this invention.
Figure 2:
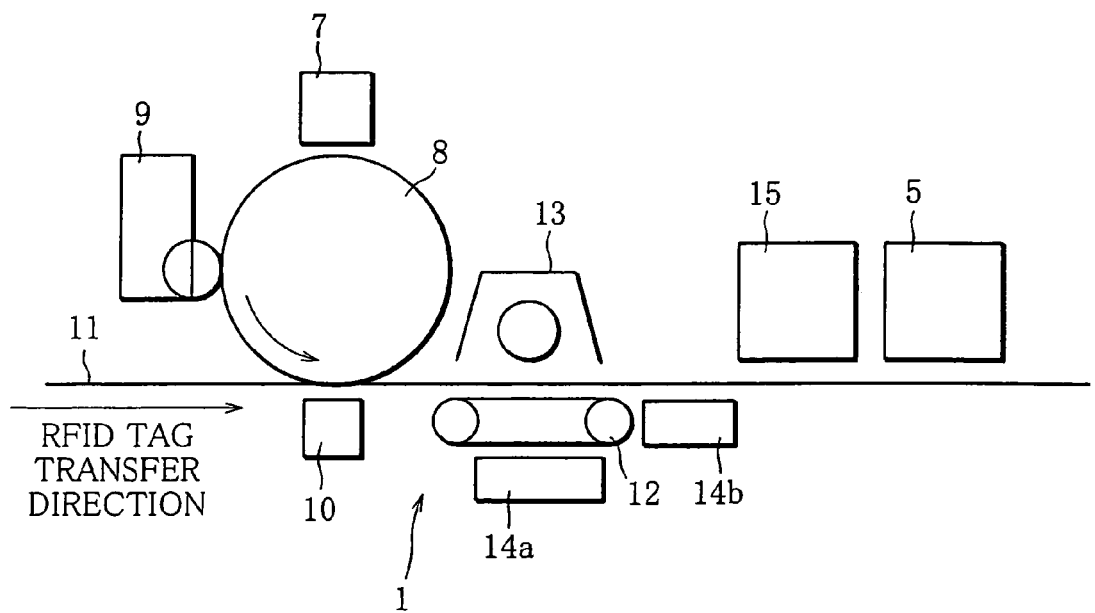
FIG. 2 is a schematic structural view of the printing system of the first embodiment.
Figure 3:
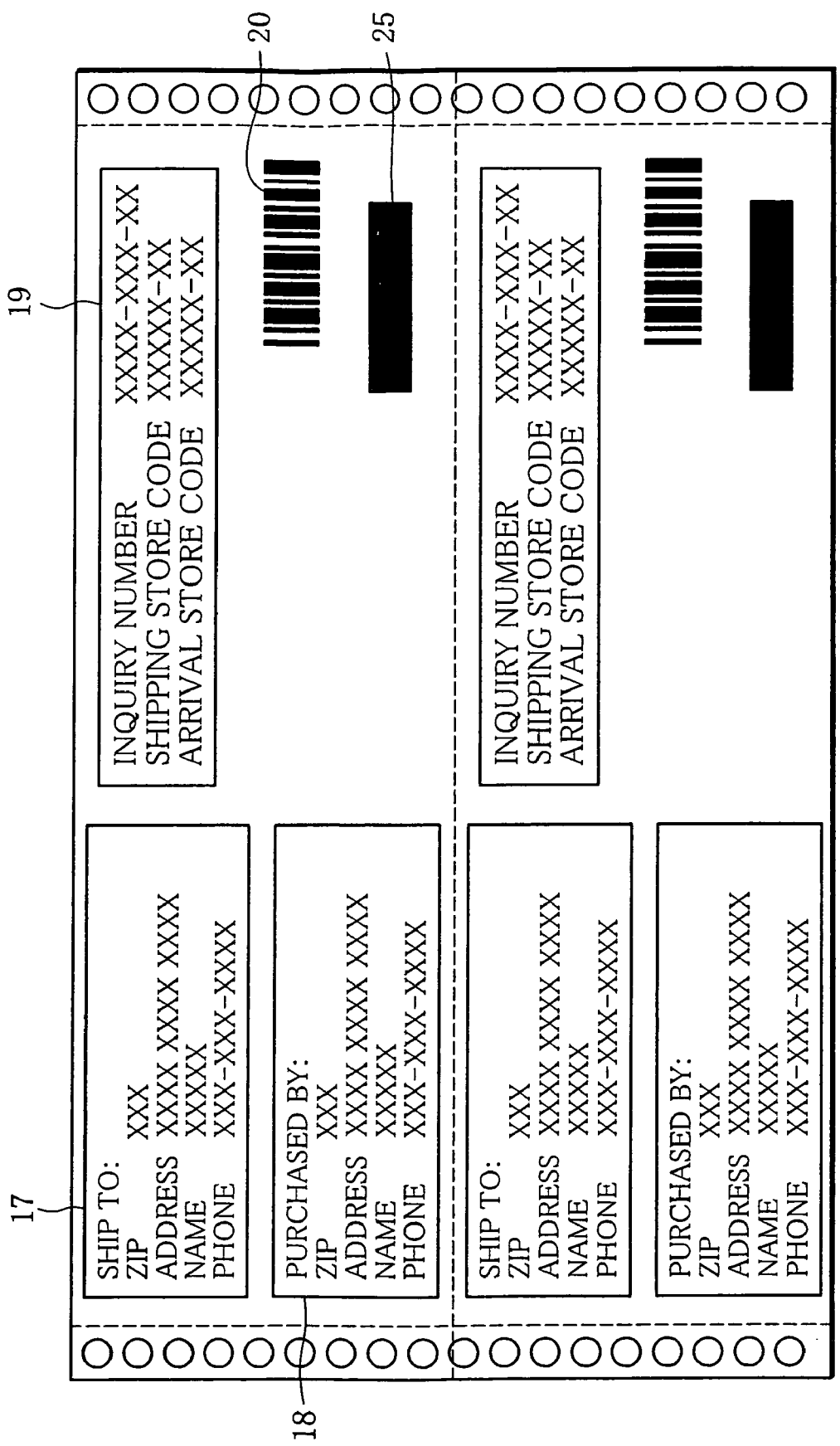
FIG. 3 is a view for explaining an RFID tag used in the first embodiment.
Figure 7:
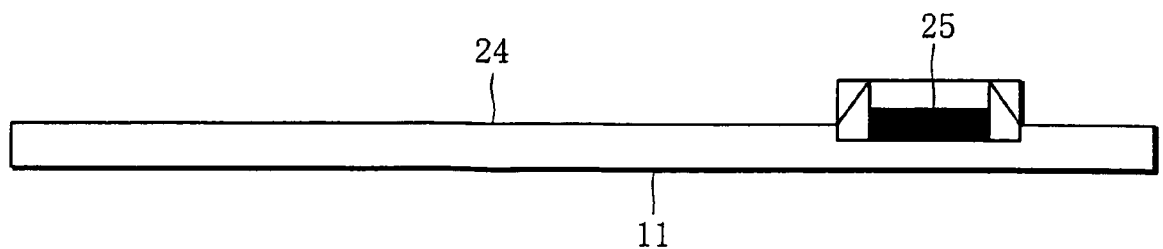
FIG. 7 is a section view of the RFID tag taken along line A-A of FIG. 6.
Figure 6:
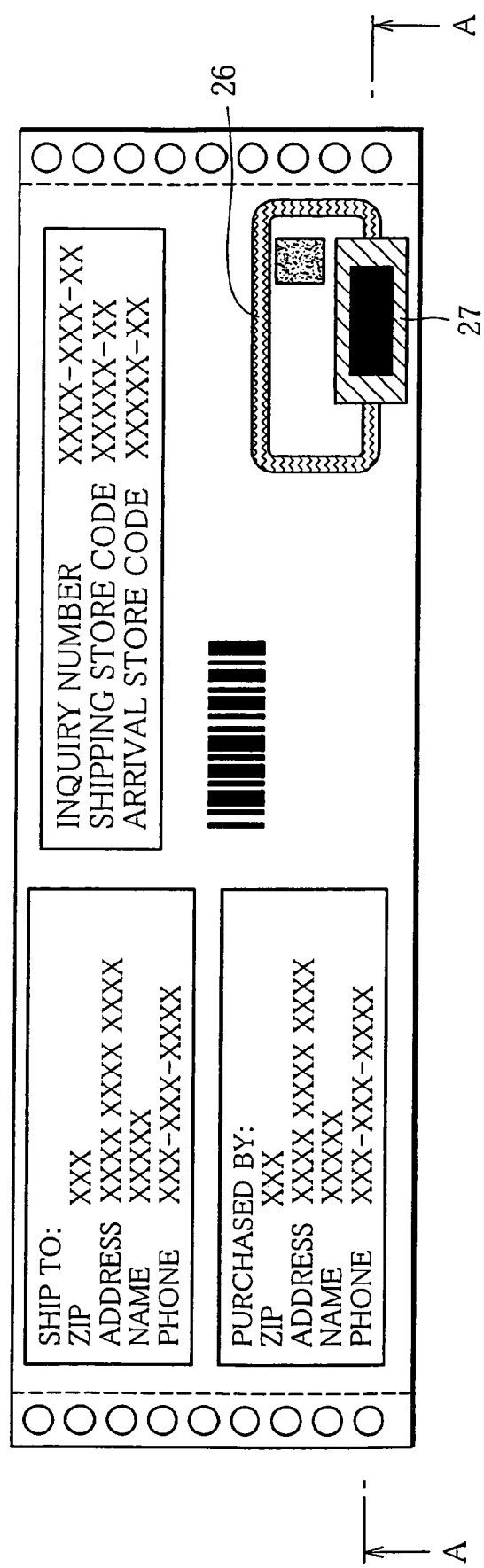
FIG. 6 is a view showing an RFID tag used in the first embodiment in a state where an RFID chip is carried on the RFID tag.

FIGS. 1 and 2 are a block diagram and a schematic structural view of the printing system, respectively. In this printing system, an electrographic printer engine is adopted as shown in FIG. 2. FIG. 3 shows an example of an RFID tag 11 used in the printing system, and FIGS. 6 and 7 show another example of the RFID tag 11. As shown in FIG. 7, the RFID tag 11 comprises a print-information recording medium 24 (hereinafter sometimes referred to as print medium) on which an RFID chip 25 is carried.

Meanwhile, although the RFID chip 25 is carried on the print-information recording medium 24, and the recording medium 24 per se constitutes the RFID tag 11 in this embodiment, there may be an arrangement where the RFID tag 11 is held on another medium (for example, the RFID tag 11 having a rear face thereof applied with adhesive glue is held on a medium that is comprised of a mount such as a separating paper).

FIG. 4 shows part of an example of a database 31 used in this printing system. In the database 31, pieces of data relating to goods to be delivered are stored for every goods in the form of data records. Each data record is constituted by a data record number (data ID), addressee information, client information, distribution information, and goods information. The addressee information and the client information each include zip code, address, name, telephone number, etc. The distribution information includes a shipping store code identifying a shipment point, an arrival store code identifying an arrival point, an inquiry number used by a customer to trace the status of delivery of goods. The goods information includes information on weight and size of goods, indication of fragile content, etc.

From the database 31, a printer controller 22 reads various pieces of information in the data record to be processed, and produces image information (character information and/or symbolic information, for instance) that is visible to human being. At the same time, from information such as the data record number (data ID) contained in the data record to be processed, the printer controller 22 produces image information that is readable by optical reading means (hereinafter sometimes referred to as code information). As shown in FIG. 2, these pieces of image information are transferred onto the RFID tag 11 (for instance, onto a surface of the print medium 24 of the tag 11) by means of a printer engine 1 (shown by reference numeral 1 in FIG. 1). Hereinafter, the image information visible to human being and the optically readable image information will collectively be referred to as print information. More specifically, in the printer engine 1, a latent image is formed on latent-image carrying means 8 by latent-image formation means 7, is developed by developing means 9, and is transferred to the RFID tag 11 by transfer means 10.

FIG. 3 shows an example of pieces of image information formed on the RFID tag 11 by the image transfer. In FIG. 3, reference numerals 17, 18, and 19 denote pieces of image information produced from addressee information, from client information, and from distribution information, respectively. For the production of image information, it is unnecessary to read out all the pieces of information from the database 31. For example, in this embodiment, the goods information is not formed into image information. Reference numeral 20 denotes image information of a code (code information) that is readable by optical reading means. The code information of this embodiment is given in the form of one-dimensional bar code, but may be a two-dimensional bar code, or characters which can be recognized by optical character recognition (OCR).

As shown in FIG. 2, the RFID tag 11 onto which the image information has already been transferred is transported in the printing system. At this time, if the RFID tag 11 is largely bent at the printer engine 1, an RFID chip 25 carried on the RFID tag may sometimes be damaged. To obviate this, the printer engine 1 of this embodiment is arranged such that the RFID tag 11 is transferred nearly linearly by the transportation means 12, without being bent or curved.

With the progress of transportation of the RFID tag 11, the image information formed on the RFID tag 11 as previously explained is fixed by non-contact fixing means 13 of the printer engine 1. The non-contact fixing means 13 is based on a flash fixing method, in which the RFID tag 11 is kept out of contact with a high-temperature roll of the fixing section, thus preventing the RFID chip 25 carried on the RFID tag 11 from being damaged.

In this embodiment, the printer engine 1 is provided with cooling means 14a for cooling the transporting means 12 and cooling means 14b for directly cooling the RFID tag 11, so as to keep the transporting means 12 and the RFID tag 11 at temperatures equal to or below a heat-resistance temperature of the RFID chip 25. The cooling means 14a, 14b may be of air-cooled type using fan or the like, or may be of water-cooled type using refrigerant.

The reason why the cooling means 14a, 14b are provided is that the temperature of the transporting means 12 can exceed the heat-resistance temperature of the RFID chip 25 due to the presence of energy irradiated from the flash lamp although the temperature of the RFID tag 11 per se hardly increases when the flash fixing is adopted. If the temperature of the transporting means 12 increases, the temperature of the RFID tag 11 can also exceed the heat-resistance temperature of the RFID chip 25, sometimes resulting in the RFID chip 25 being damaged. In some cases, it is necessary to provide means for suppressing the temperatures of the transporting means 12 and the RFID tag 11 to below or equal to the heat-resistance temperature of the RFID chip 25.

The printer engine 1 of this invention may be arranged to have either one or more of the following: the transporting means 12 for nearly linearly transporting the RFID tag 11, the non-contact fixing means 13, and the cooling means 14a, 14b.

Next, as shown in FIG. 2, the RFID tag 11 is transported to a bar code reader 15 serving as the optical reading means. The bar code reader 15 corresponds to an optical code-reading unit 6 shown in FIG. 1.

In FIG. 1, the code information (for instance, data ID) read by the optical code-reading unit 6 is sent to an RFID write-data generating subsystem 23. In accordance with the code information, the RFID write-data generating subsystem 23 reads out the relevant addressee information, client information, distribution information, and goods information from the associated data record in the database 31, and generates electronic information (RFID data) to be written into the RFID tag 11 (more specifically, into the RFID chip 25 of the tag 11). The data is sent to an RFID writing unit 59, and written into the RFID tag 11. The RFID writing unit 59 is an RFID reader/writer shown by reference numeral 5 in FIG. 2. The RFID write-data generating subsystem 23 may be built into the RFID writing unit 59 (RFID reader/writer 5).

In this manner, the writing of the electronic information into the RFID tag 11 is performed by using the code information printed on the RFID tag 11 as key, whereby the consistency is ensured between the electronic information (RFID data) held in the RFID tag 11 and the image information printed on the RFID tag 11 and visible to human being. The consistency can be further ensured by disposing the bar code reader 15 and the RFID reader/writer 6 as closest as possible to each other, as shown in FIG. 2.

In order to reliably write the RFID data into the RFID tag 11, the RFID tag 11 must be kept within a readable/writable area of the RFID reader/writer 5 for a certain period of time. In the case of the printer engine that is high in printing speed, the RFID tag 11 can pass through the readable/writable area of the RFID reader/writer 5 in a time period shorter than the time period required for the writing processing, so that the writing of information into the RFID tag 11 cannot be completed.

Figure 5:
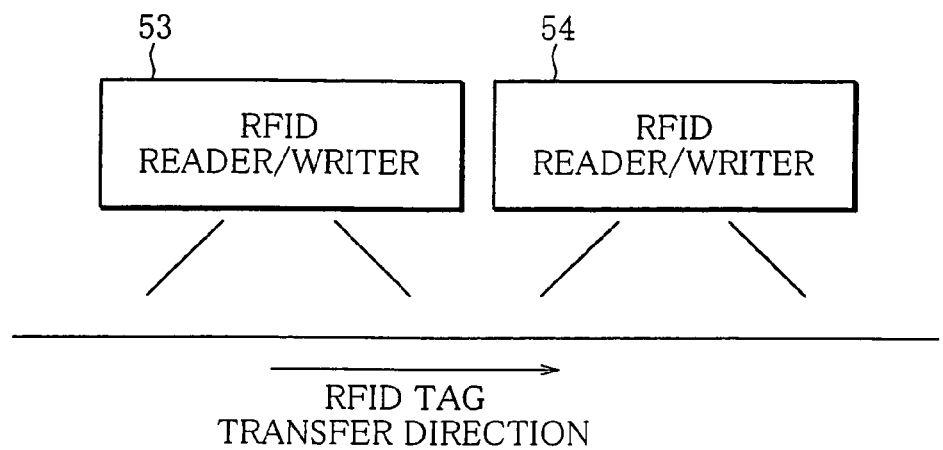
FIG. 5 is a view showing an example of arrangement of RFID readers/writers in the first embodiment.

In this regard, there is some RFID tag 11 having the RFID chip 25 whose storage region is divided into plural pages. In that case, the RFID data is written into the RFID chip 25 in units of page. By decreasing the number of pages into which the writing is made by one RFID reader/writer, an amount of data to be written by one RFID reader/writer into the RFID chip 25 decreases, and a time period required for the writing is shortened. Therefore, especially in the case of using a printer engine that is high in printing speed, a plurality of, for example, two RFID readers/writers are juxtaposed in the direction of transfer of the RFID tag 11, as shown in FIG. 5. For example, a first RFID reader/writer 53 is adapted to write part of the RFID data into the first page of the RFID chip 25 and a second RFID reader/writer 54 is adapted to write the remaining of the RFID data into the second page of the RFID chip 25.

By doing so, even in the printer engine that is high in printing speed, each RFID reader/writer 53 or 54 can complete the writing processing before the RFID tag 11 passes through the readable/writable area thereof. The number of RFID readers/writers may be increased for a printer engine that is much higher in printing speed.

When RFID tags 11 are carried at a shorter distance from one another, more than one RFID tags can simultaneously be present within the same readable/writable area, so that the same information may be written into these RFID tags. To obviate this, the readable/writable area of each RFID reader/writer 5 and the distance between the RFID tags 11 must be set in such a manner that only a single RFID tag 11 is present within the readable/writable area of the RFID reader/writer 5.

FIG. 6 shows the RFID tag 11 used in this embodiment that comprises the print medium 24 on which the RFID chip 25 is carried. FIG. 7 is a sectional view taken along line A-A of FIG. 6 and showing an RFID-chip carrying portion of the RFID tag 11.

When the RFID chip 25 has a thickness that is innegligible compared to the thickness of the print medium 24, there is a level difference in a print face of the print medium 24 as shown in FIG. 7. When the printing is made by the printer engine onto the print face of the print medium with such a level difference, normal printing cannot sometimes be carried out on the print face around the level difference. Specifically, the RFID chip 25 has a border portion 27 thereof as shown by hatching in FIG. 6, and the print face of the print medium 24 has the level difference at the border portion 27 where abnormal printing may be caused. In this embodiment, therefore, the image information visible to human being and the code information readable by the optical reading means are printed on a substantially flat portion of the print face, avoiding the border portion 27 (level difference).

As shown in FIG. 6, the RFID tag 11 has an antenna 26 used for communication between the tag and the RFID reader/writer 5 or the like. When toner, ink, or the like having electrically conductive substance such as carbon is used for the printing and when the image information, bar code, or the like is printed on the RFID tag to overlap the antenna 26, a trouble can be caused in the communication between the RFID tag and the RFID reader/writer 5 or the like. When the toner, ink, or the like includes a magnetic material such as magnetite, a similar communication trouble can also be caused due to the influence of magnetism of the magnetic material. In such cases, by making the printing in a manner avoiding the antenna 26 or the vicinity thereof, the communication trouble between the RFID tag and the RFID reader/writer 5 can advantageously be eliminated.

Although the RFID chip 25 is carried on the front face side (on which the print information is printed) of the RFID tag 11 in this embodiment, the RFID chip 25 may be provided on the rear face side (opposite the front face) of the RFID tag 11, or may be embedded into the inside of the RFID tag 11 (for example, the RFID chip 25 is sandwiched between two recording media, etc.).

In the following, a printing system according to a second embodiment of this invention will be explained with reference to FIGS. 8 and 9.

Figure 8:
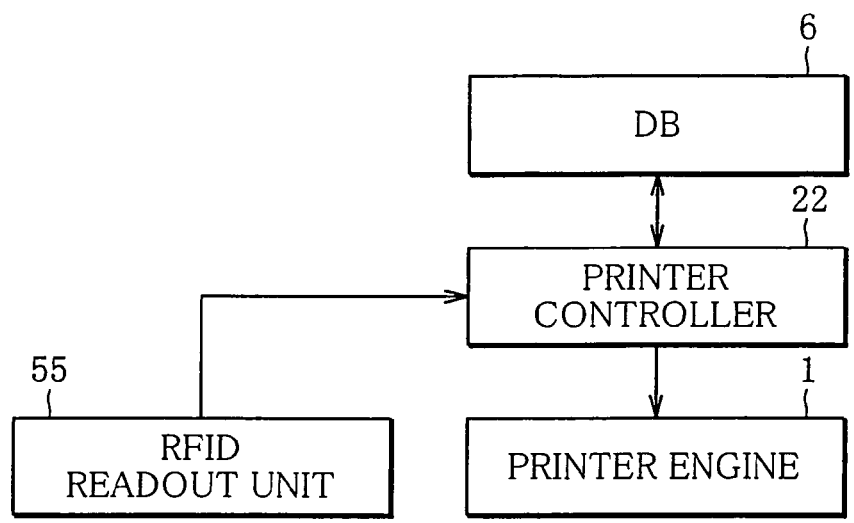
FIG. 8 is a block diagram showing a printing system according to a second embodiment of this invention.
Figure 9:
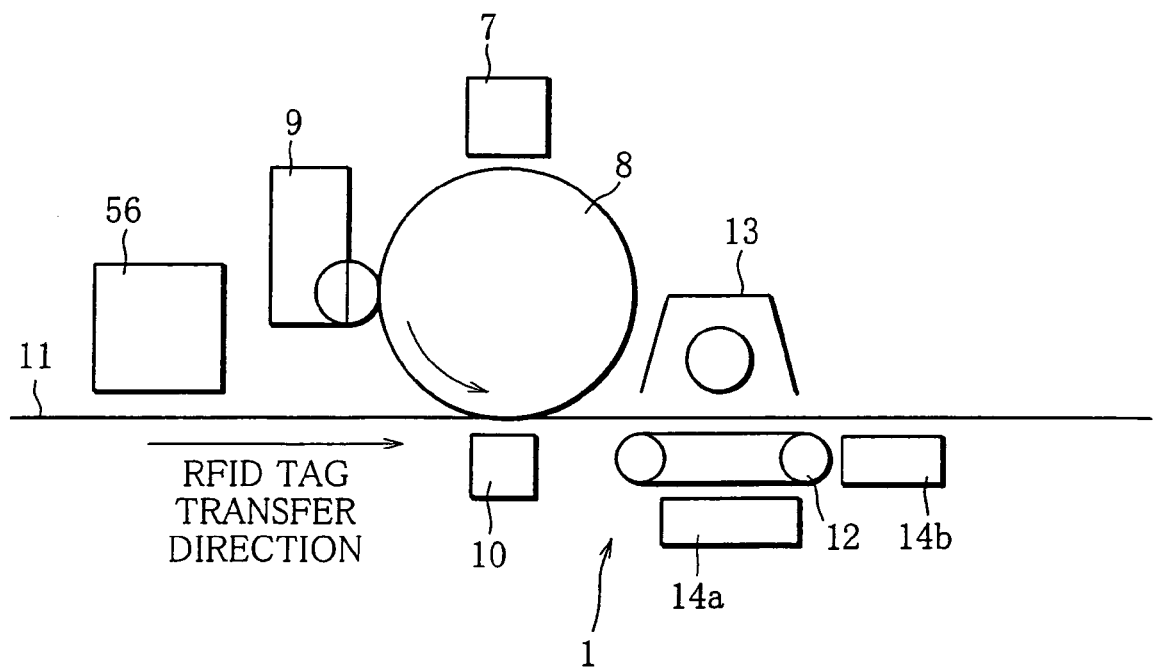
FIG. 9 is a schematic structural view of the printing system of the second embodiment.

FIGS. 8 and 9 are a block diagram and a schematic structural view of this printing system. In FIGS. 8 and 9, the same elements as those shown in FIGS. 1-7 are denoted by the same numerals.

Unlike in the printing system of the first embodiment where the RFID data consistent with the code information already printed on the RFID tag 11 is written into the RFID tag 11, in the printing system of the second embodiment, the RFID data is first read out from the RFID tag 11 written in advance with the RFID data. Then, the image information and/or the code information associated with the RFID data is printed on the RFID tag 11. As in the case of the first embodiment, the printing system of the second embodiment is suited, for example, to prepare packaging slips for home delivery service that are used for goods delivery in large quantity from a department store or a mail-order selling company. The following is an explanation of the construction of the printing system.

Referring to FIGS. 8 and 9, the RFID data is read out by an RFID readout unit 55 from the RFID chip 25 of the RFID tag 11. On the basis of the thus read RFID data and various pieces of information relating to the processing object and read out from the database 31, the printer controller 22 generates image information visible to human being. At the same time, from the data ID of the data record relating to the processing object, image information of code that is readable by optical reading means is generated. These pieces of image information (print information) are printed on the RFID tag 11 by the printer engine 1. Although both the image information visible to human being and the image information of code readable by optical reading means can be generated and printed as mentioned above, only either one of them may be generated and printed.

In the printer engine 1, the RFID tag 11 is ordinarily transported at a given constant speed. Therefore, by taking a time period required for the RFID tag 11 being transported from an RFID reader/writer 56 to the transfer means 10 by which the print information is printed on the RFID tag 11, the consistency is ensured between the electronic information (RFID data) already written into the RFID tag 11 and the print information to be printed on the RFID tag 11 by the printer engine 1. In order to much improve the consistency, the printing of image information on the RFID tag and the writing of information into the tag may be controlled based on a common time basis, as in the later-mentioned embodiment.

The RFID data to be written beforehand in the RFID tag 11 may include all or one or more of addressee information, client information, and goods information. For instance, the RFID data may include only the data ID of the data record of the processing object. This is advantageous in that an amount of information can be reduced, resulting in reduction in the time of writing and reading the information into and from the RFID tag 11. A further advantage is to eliminate a fear that private information such as addressee information and client information is read by third party from the RFID tag 11.

In the following, with reference to FIGS. 10 and 11, a printing system according to a third embodiment of this invention will be explained.

Figure 10:
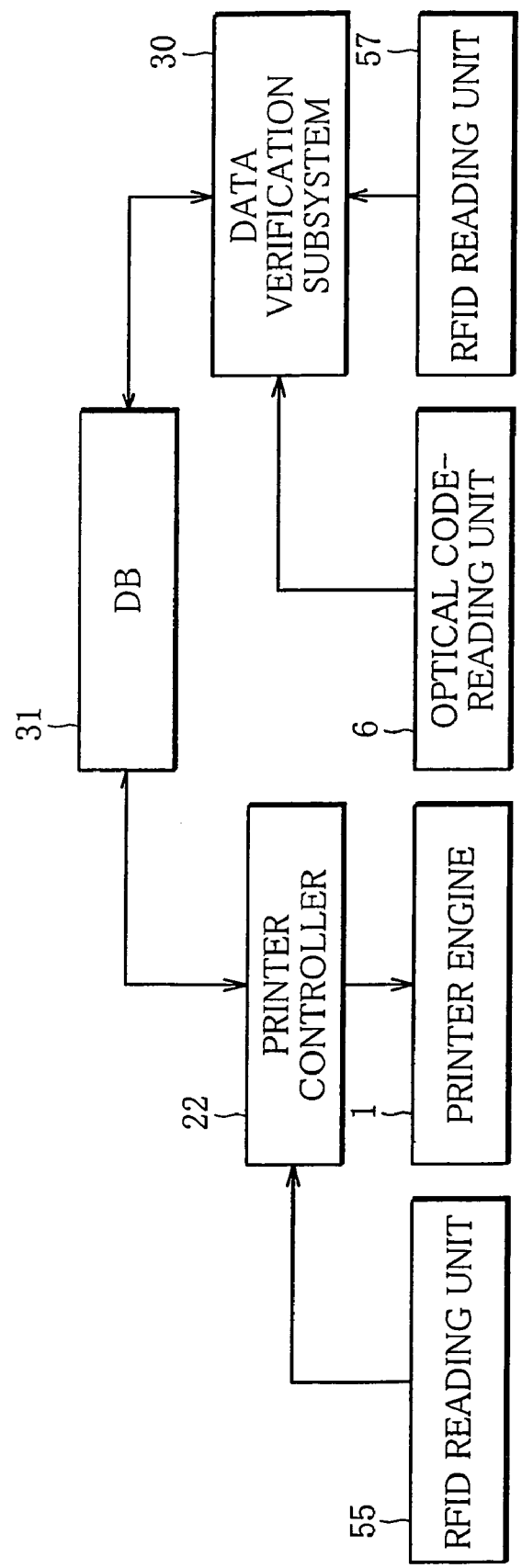
FIG. 10 is a block diagram showing a printing system according to a third embodiment of this invention.
Figure 11:
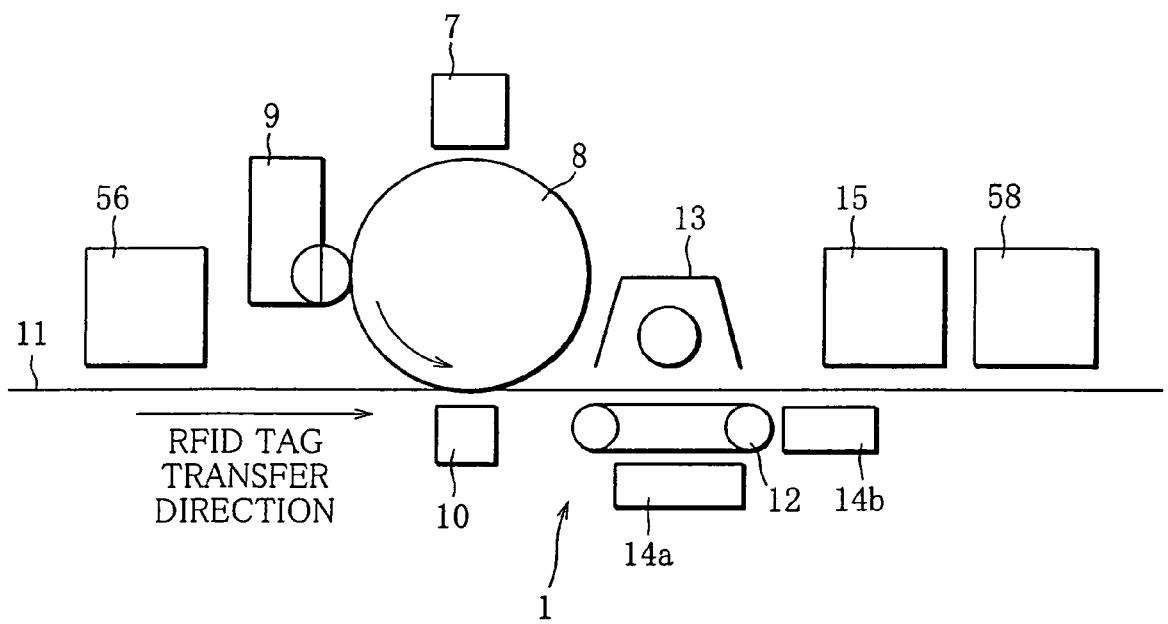
FIG. 11 is a schematic structural view of the printing system of the third embodiment.

FIGS. 10 and 11 are a block diagram and a schematic structural view of the printing system, respectively. In FIGS. 10 and 11, the same elements as those shown in FIGS. 1-9 are denoted by the same numerals.

The printing system of the third embodiment is basically the same as that of the second embodiment, but differs therefrom in that the consistency between electronic information and print information is verified.

Specifically, as in the second embodiment, the printing system of third embodiment is adapted to read out the electronic information (RFID data) from the RFID tag 11 in which such data is written beforehand, and print the image information and/or the code information associated with the RFID data onto the RFID tag 11. This printing system is suited to prepare packaging slips for home delivery service that are used for goods delivery in large quantity from a department store or a mail-order selling company. The following is an explanation on the construction of the printing system of the third embodiment.

Referring to FIGS. 10 and 11, in this printing system, the electronic information written beforehand in the RFID tag 11 is read out therefrom by the RFID readout unit 55, both the image information visible to human being and the image information of code readable by optical readout means are generated by the printer controller 22, and these pieces of image information are printed on the RFID tag 11 by the printer engine 1. This construction is the same as that of the printing system of the second embodiment (see, FIGS. 8 and 9).

Next, in the third embodiment, the optically readable code information printed on the RFID tag 11 is read out by the optical code readout unit 6, the electronic information (RFID data) is read out from the RFID tag 11 by an RFID readout unit 57, and the consistency between the code information and the electronic information is verified by a data verification subsystem 30 on the basis of data of the database 31.

The provision of the data verification subsystem 30 for verifying the data consistency makes it possible to further improve the consistency between the electronic information carried on the RFID tag 11, the image information visible to human being, and the image information of code (i.e., code information) readable by the optical readout means. The reading of the code information by the optical code readout unit 6 and the reading of the electronic information from the RFID tag 11 by the RFID readout unit 57 may be made in the reverse order compared to the aforementioned order, or may be made substantially simultaneously.

The optical code-reading unit 6, RFID reading unit 55, and RFID reading unit 57 shown in FIG. 10 correspond individually to the bar code reader 15, RFID reader/writer 56, and RFID reader/writer 58 shown in FIG. 11.

Next, with reference to FIGS. 12-19, a printing system according to a fourth embodiment of this invention will be explained.

Figure 12:
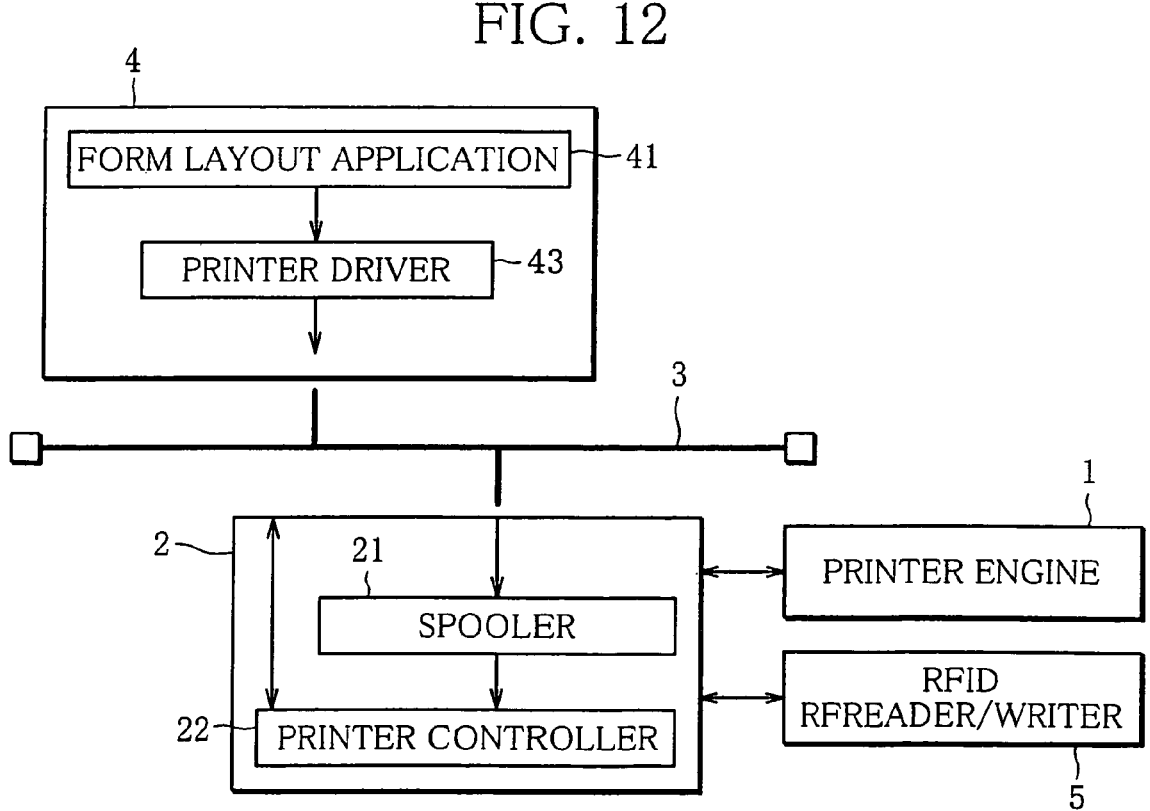
FIG. 12 is a block diagram showing a printing system according to a fourth embodiment of this invention.

FIG. 12 shows an example of the basic construction of the printing system of the fourth embodiment. As shown in FIG. 12, this printing system is comprised of the printer engine 1, the RFID reader/writer 5, and a controller 2 having a spooler 21 and the printer controller 22. The printer engine 1 and the RFID reader/writer 5 are connected to the controller 2 that is connected to the network 3 which is an electronic communication network such as internet, local area network (LAN), or the like.

Using the controller 2 and the printer engine 1, the printing system is adapted to print that drawing data onto the print-information recording medium, which is "print" activated from a form layout application program 41 on a client personal computer 4 connected to the network 3.

The form layout application program 41 running on the personal computer 4 is a program that is capable of laying out image information such as text, bar code, etc. on the display screen of the computer 4, and capable of outputting drawing data corresponding to the image information to a device such as a printer driver. The drawing data is data, such as font data or bit map data, that is so converted as to meet various device interfaces of an operation system (OS) 42, in order to enable the image information laid out by the form layout application program 41 to be output to devices such as display device, printer driver, etc.

The client personal computer 4 has a printer driver 43 for the printing system. The printer driver 43 is a software that has a function for converting the drawing data prepared by the application 41 into page description language data (hereinafter referred to as PDL data) for the printer. The PDL data is data, for example Postscript data, from which is generated video data that can be interpreted by the printer controller 22 and is transmitted to the printer engine 1.

The controller 2 connected to the network 3 is a computer that includes the spooler 21 and the printer controller 22, as mentioned above, and that is adapted to transmit the video data and/or control data. The spooler 21 is a group of dynamic link libraries (DLLs) to perform receipt, save (spool), process, scheduling, distribution, etc. of the PDL data that is output from the printer driver 43. Ordinarily, the spooler is realized by part of functions of the operating system of the controller 2.

The printer controller 22 has a software that has functions of receiving the PDL data from the spooler 21, converting the same into the video data and/or control data for the printer engine, and transmitting the converted data to the printer engine 1. The video data is bit map data or the like corresponding to the resolution of the printer engine 1. The control data is data used for execution of operation or processing of the printer engine 1. The operation includes form feed or the like. The processing includes, for instance, acquisition of the status of the printer engine 1 such as error information.

The printer controller 22 transmits the printer-engine control data to the printer engine 1 for control of the operation and/or processing of the printer engine, and controls the processing of the RFID reader/writer 5. The processing includes acquisition of the status of RFID reader/writer such as error information thereon.

The printer engine 1 is a printing unit having a function of printing the image information (print information) on the print medium 24 of the RFID tag 11 based on the video data transmitted from the printer controller 22. The RFID reader/writer 5 is a unit having a function to write the electronic information (RFID data) into the RFID chip 25 of the RFID tag 11 based on the RFID write data transmitted from the printer controller 22. The RFID write data includes control data used to control the RFID reader/writer, and also includes data that is comprised of text information such as alphabet or Chinese character to be written into the RFID tag 11. The text information may include, for example, address and name for direct mail, local ID used to identify each individual corrugated board box used for distribution, and the like.

Next, referring to FIG. 13, the flow of printing in this printing system will be explained. Hereinafter collectively referred to as print data are: video data transmitted from the printer controller 22 to the printer engine 1, PDL data transmitted from the printer driver 43 to the printer controller 22 and describing information of the video data, and drawing data transmitted from the form layout application program 41 to the printer driver 43 and describing information of the PDL data.

Also collectively referred to as RFID data are: RFID write data transmitted from the printer controller 22 to the RFID reader/writer 5, PDL data describing information of the RFID data and transmitted from the printer driver 43 to the printer controller 22, original RFID data describing information of the PDL data and transmitted from the form layout application program 41 to the printer driver 43, and other data written in the RFID data.

Figure 13:
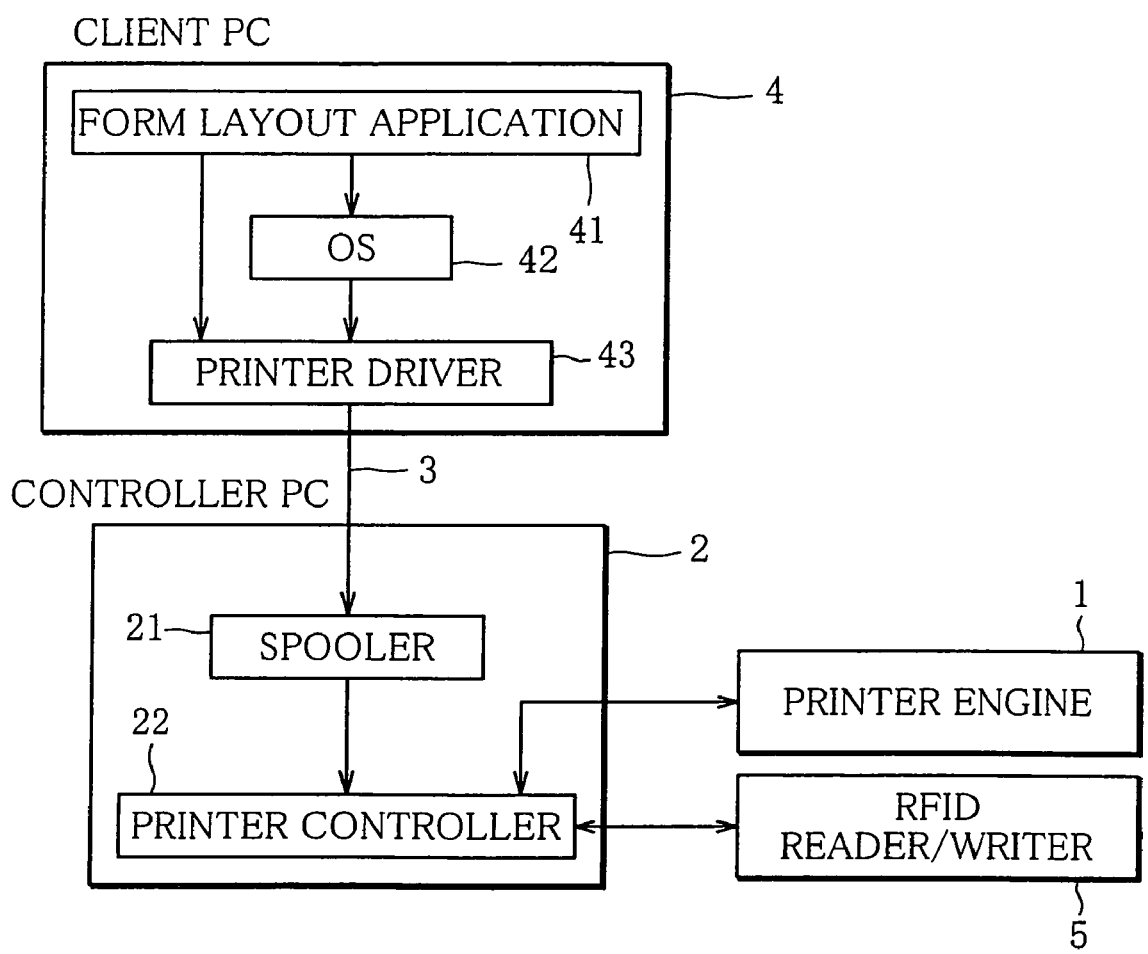
FIG. 13 is a block diagram showing the flow of printing in the fourth embodiment.

As shown in FIG. 13, when the print data edited by the form layout application program 41 running on the client personal computer 4 is "print" started, drawing data that forms print data is temporally stored in the operating system (OS) 42 from which the drawing data is transmitted to the printer driver 43.

The RFID data edited by the form layout application program 41 is converted into PDL data format by means of the form layout application program 41 simultaneously when the "print" start is activated. The converted data is transferred as the original RFID data to the printer driver 43. The original RFID data includes text information described in the RFID write data transmitted to the RFID reader/writer, and also includes control data such as position information of the RFID write data.

The printer driver 43 receives the drawing data from the operating system 42, and receives the original RFID data from the form layout application program 41. The printer driver 43 converts these pieces of data into the PDL data for the printer engine 1 and the RFID reader/writer 5, and transfers the PDL data to an arbitrary port. The port to which the PDL data is transferred is generally a printer port, but may be a printer server on the network or an arbitrary device such as a hard disk on the network.

In the following, an explanation will be given for a case where the PDL data is transferred from the printer driver 43 to the spooler 21 of the controller 2 on the network 3. The spooler 21 can temporally save (spool) the PDL data generated by and received from the printer driver 43, and can also perform scheduling of and distribution of the PDL data to an arbitrary device. In this printing system, the printer controller 22 is arranged to read the PDL data from the spooler 21 as required. The printer controller 22 interprets the PDL data read from the spooler 21, and converts the same into the video data for printer engine and the RFID write data for the RFID reader/writer.

The print data edited by the form layout application program 41 running on the client personal computer 4 is converted into the PDL data as described above, is transmitted to the printer engine 1 through the printer controller 22, and is printed onto the print medium 24 of the RFID tag 11 by the printer engine. Similarly as for the RFID data, the original RFID data is output from the form layout application program 41 and converted into the PDL data. The RFID write data is transmitted through the printer controller 22 to the RFID reader/writer 5, and the text data of the RFID write data is written into the RFID chip 25 of the RFID tag 11.

Figure 14:
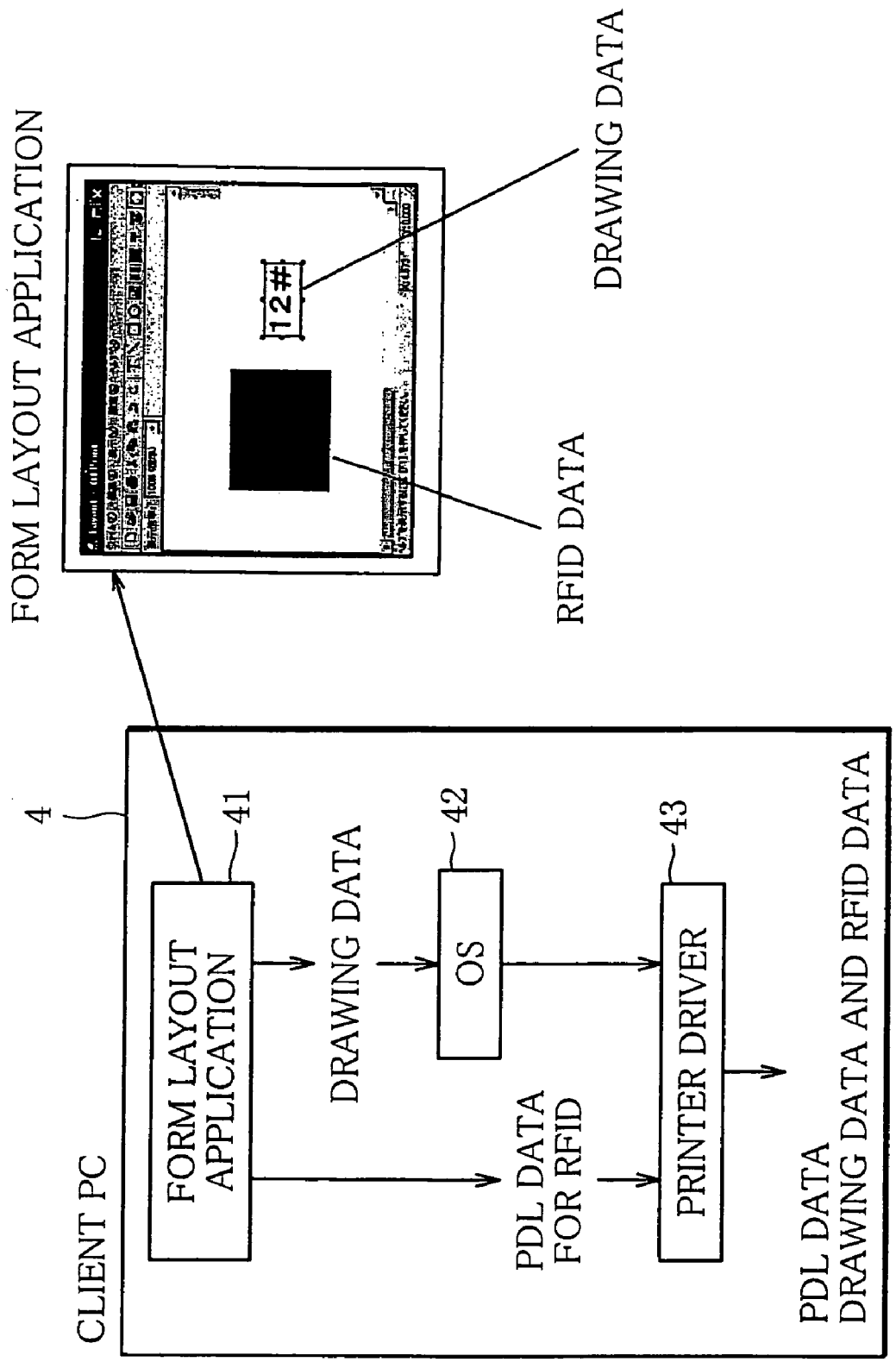
FIG. 14 is a view showing the flow of data between a form layout application and a printer driver in the fourth embodiment.

FIG. 14 shows the flow of data between the form layout application program 41 and the printer driver 43 in the printing system. As mentioned above, the printer driver 43 is a software having a function of converting the print data designed by the form layout application program 41 running on the personal computer 4 into the PDL data for the printer engine. Meanwhile, the printer driver 43 of this embodiment is enabled to directly communicate with the form layout application program 41 to handle data other than the print data edited by the form layout application program 41. Thus, data describing control data and/or text information output from the form layout application program 41 can be incorporated into the PDL data.

In this printing system, the print data to be printed by the printer engine 1 is transmitted as the drawing data from the form layout application program 41 to the printer driver 43, and is converted into the PDL data by the printer driver 43. As for the RFID write data to be written into the RFID reader/writer, the original RFID data converted into the PDL data format by the form layout application program 41 is transmitted from the program 41 to the printer driver 43, and is then converted into the RFID write data by the printer controller 22.

The printer controller 22 interprets a control command contained in the PDL data output from the printer driver 43, and generates the video data and the RFID write data that are to be transmitted to the printer engine 1 and the RFID reader/writer 5, respectively.

The print data edited by the form layout application program 41 includes position information representing locations on the print medium 24 where the text and the bar code are to be positioned. Similarly, the RFID data designed by the form layout application program 41 includes position information representing a location on the print medium 24 at which the RFID data (RFID chip 25) is positioned. These position information contained in the print data and the RFID data are also held in the PDL data format that is output from the printer driver 43.

Figure 15:
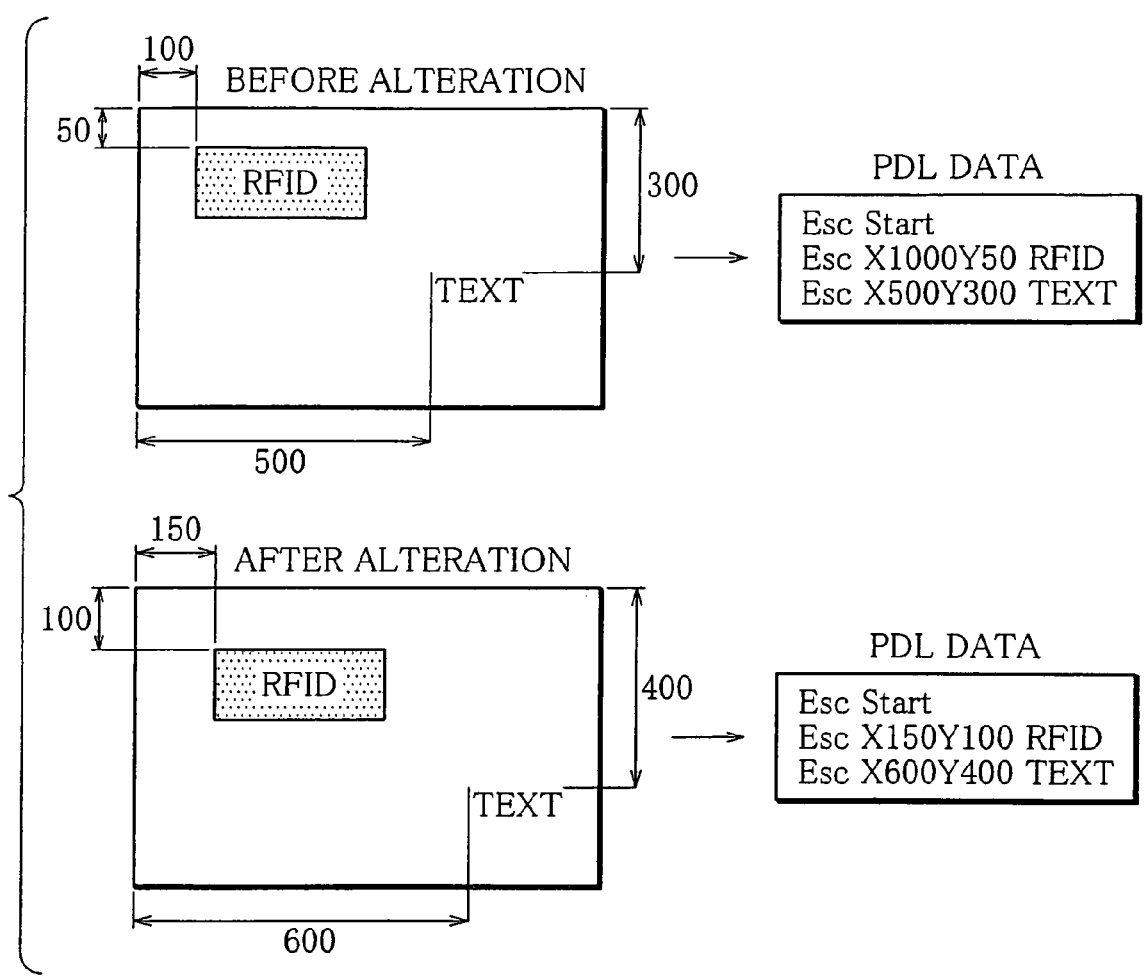
FIG. 15 is a view showing PDL data and position information thereof in the fourth embodiment.

For instance, when the position of the print data, which is edited on the editing screen of the form layout application program 41, is altered as shown in FIG. 15, the position information contained in a control command in the PDL data, prepared by the printer driver 43 and the form layout application program 41, is altered accordingly. On the basis of the position information contained in the control command described in the PDL data, the printer controller 22 prepares the video data to be output to the printer engine 1. For instance, the printer driver 43 of this embodiment is adapted to output, as control command, the position information represented in units of resolution of the printer engine 1 in reference to the left upper corner of the recording medium.

As mentioned above, the RFID data includes the position information. For example, the form layout application program 41 displays a rectangular frame on the editing screen to visualize the location of the RFID data on the print medium 24, as shown in FIG. 15, and holds a coordinate position of the rectangular frame as the position information of the RFID data. The form layout application program 41 can set the rectangular frame representing the RFID data at an arbitrary position. The position information is formed by X- and Y-coordinate values individually measured in the width direction and in the transfer direction of the print medium 24 from the coordinate origin, i.e., the left upper corner of the print medium 24.

In the example of FIG. 15, the print data and the RFID data before alteration are at positions (500, 300) and (100, 50) as shown in upper part of FIG. 15, whereas the print data and the RFID data after alteration are at positions (600, 400) and (150, 100) as shown in lower part of FIG. 15.

As mentioned above, the original RFID data output from the form layout application program 41 is output to the printer driver 43. At this time, the original RFID data is transmitted to the printer driver 43 in the form that is a combination of the X- and Y-coordinate values, serving as the position information, and the text information to be written into the RFID reader/writer 5.

The form layout application program 41 can display and edit the print data and the RFID data on the editing screen. The print data is converted by the printer driver 43 into the PDL data to be transmitted to the printer controller 22, and the RFID data is converted by the form layout application program 41 into the original RFID data of PDL data format, which are transferred to the printer driver 43.

The printer driver 43 converts the drawing data first received into the PDL data, and combines the same with the next received original RFID data to thereby unify the PDL data, making it easy to synchronize the printing with the writing of the RFID data.

The print data is generally given in units of page, and a page break in printing (page-based printing) is made according to a control command such as "ESC0C." In this printing system, PDL data serving as the basis of video data to be printed at an arbitrary page of the print medium 24 is combined with PDL data serving as the basis of RFID write data to be written into the RFID chip 25 carried on the same page.

Using, as a command time basis, a signal transmitted for every page from the printer engine 1 to the controller, such as for example, a signal that is called as final raster signal, the RFID write data is transmitted to the RFID reader/writer 5. This makes it easy to ensure the consistency between the video data printed on an arbitrary page of the print medium 24 and the RFID data written into the RFID chip 25 carried on that page.

Figure 16:
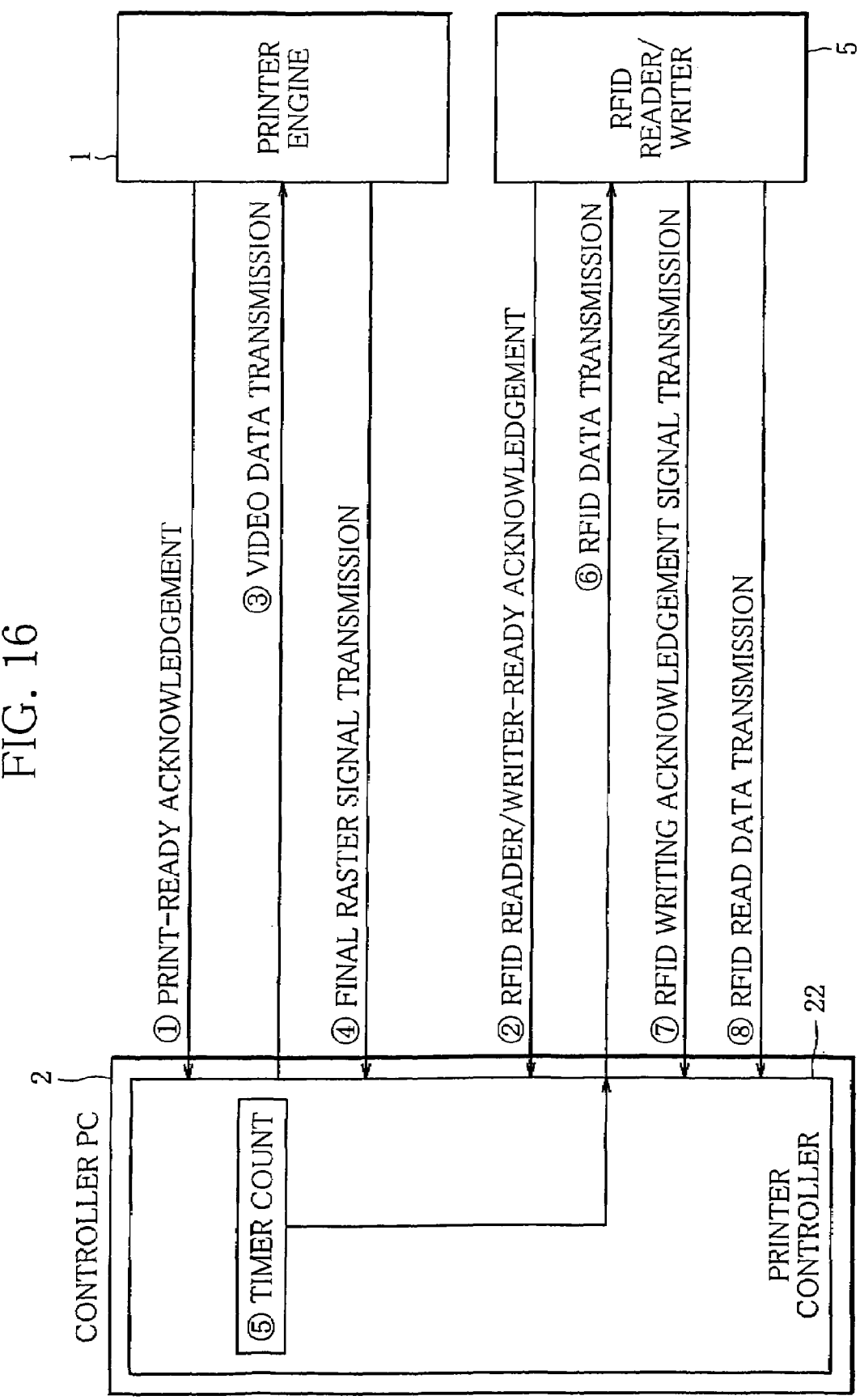
FIG. 16 is a view showing the flow of data in the fourth embodiment between a printer controller and a printer engine and between the printer controller and an RFID reader/writer.

FIG. 16 shows the flow of data between the printer controller 22, the printer engine 1, and the RFID reader/writer 5 in this printing system. The printer controller 22 communicates with the printer engine 1, and also communicates with the RFID reader/writer 5. Synchronization between the printer engine 1 and the RFID reader/writer 5 is achieved through the printer controller 22.

The printer controller 22 receives pieces of status data (print-ready acknowledgement and RFID reader/writer-ready acknowledgement) individually from the printer engine 1 and the RFID reader/writer 5, and confirms that preparations for printing and RFID writing have been completed. Next, when the "print" start is specified by the form layout application program 41, the conversion into PDL data is performed by the printer driver 43 and the form layout application program 41, and the printer controller 22 receives the PDL data for one page. In the printer controller 22, the PDL data for one page is stored in a printer controller buffer, and is divided into the print data and the RFID data.

The print data is converted into the video data as explained before, and is transmitted to the printer engine 1 (video data transmission). Whereupon, print information is printed on the first page of the print medium 24. The RFID data for the first page is stored in the leading address of an RFID buffer table of the printer controller 22. Next, the data for the second page is also divided into print data and RFID data, and the print data is converted into video data and transmitted to the printer engine 1, whereby the print information is printed on the second page of the print medium 24. Similarly, the RFID data for the second page is stored in the second address of the RFID buffer table of the printer controller 22. Subsequently, the aforesaid processing is repeated.

The printer engine 1 transmits the final raster signal to the printer controller 22 (final raster signal transmission) each time when the final raster for each page is printed on the print medium. The printer controller 22 causes the final raster buffer table to sequentially store the time when the final raster signal is received. At this time, as in the case of the RFID buffer table, the printer controller 22 causes the final raster buffer table to store the time when the final raster signal for the first page is received into its leading address, and store the time when the final raster signal for the second page is received into its second address.

In the printing system, the writing time of the RFID write data into the RFID reader/writer 5 is determined from the printing speed of the printer engine 1, the time when the final raster was printed by the printer engine, a printing position at which an image is to be formed on the print medium 24 by the printer engine 1, and a distance between the printing position and the RFID reader/writer 5. The write time is represented as follows:

$Rf$Time=$Ls$Time+$P$-$R$Length/PrintSpeed, where RfTime denotes the writing time; LsTime, the time when the final raster was printed; PrintSpeed, the printing speed; and P-RLength, the distance between the printing position and the RFID reader/writer as seen in the print-medium transfer path.

When writing the data into the RFID chip carried on the leading page of the print medium 24, a monitoring task of the printer controller 22 calculates the data writing time, at which the data is to be written into the RFID reader/writer 5, in accordance with the aforesaid formula on the basis of the final-raster printed time LsTime stored in the leading address of the final raster buffer table, and the like. When the calculated time is reached (timer count), the RFID write data for the leading page stored in the leading address of the RFID buffer table is transmitted to the RFID reader/writer 5 (RFID data transmission). When the transmission of the RFID write data is completed, both the data stored in the leading address of the final raster buffer table and the data stored in the leading address of the RFID buffer table are deleted. Furthermore, as described later, an RFID writing acknowledgement signal and/or RFID read data is transmitted from the RFID reader/writer 5 to the printer controller 22 (RFID writing acknowledgement signal transmission and/or RFID read data transmission). Subsequently, similar processing is performed for the second and subsequent pages until the printing is interrupted.

In the printing system, the status of the printer engine 1 can be acquired by transmitting a particular control command from the printer controller 22 to the printer engine 1, whereby the printing speed (PrintSpeed) can be determined.

As explained above, the synchronization between the printing of print data by means of the printer engine 1 and the writing of the RFID write data into the RFID reader/writer is achieved by controlling the transmission, etc. of print data and RFID data by the printer controller by using, as the common time basis, the final raster signal that is output from the printer engine 1. Instead of using the final raster signal output from the printer engine 1, a signal generated in the printer controller 22 may be used as the common time basis.

In this embodiment, an example where the RFID reader/writer 5 is arranged at an ejection section of the printer engine 1 has been described. Alternatively, the RFID reader/writer 5 may be arranged at an arbitrary position at the rear of the printer engine 1 so long as the distance (P-Rlength) between printer engine and RFID reader/writer can be determined. Furthermore, the RFID reader/writer 5 may be arranged at a paper feed section of the printer engine 1. In this case, the distance (P-Rlength) between printer engine and RFID reader/writer in the print-medium transfer path is calculated to have a negative sign.

FIG. 17 shows the flow of data in a case where the RFID chip 25 is carried on the print medium 24 at an arbitrary position in the print-medium transfer direction. In the printing system, position information can be added to the RFID data of PDL data format. Thus, the RFID chip 25 can be carried on an arbitrary position in a given page of the print medium 24, and the RFID write data can be written into the RFID chip 25 carried on such arbitrary position. In case that the RFID data frame is moved on the form layout application program 41 to an arbitrary position in the direction of transfer of the print medium 24, the writing time of the RFID write data into the RFID reader/writer 5 is represented as follows:

$Rf$Time = $Ls$Time + ($P$ − $R$Length) / PrintSpeed + Rf_YLength / PrintSpeed, where Rf_YLength denote a distance from the head of page of the print medium to the RFID chip as viewed in the print-medium transfer direction.

As explained above, even when the carried position of the RFID chip 25 on the print medium 24 is changed in the print-medium transfer direction, the data writing into the RFID chip carried on the print medium at an arbitrary position in the print-medium transfer direction can be carried out by changing the writing time of the RFID write data from the printer controller 22 into the RFID reader/writer 5. Meanwhile, FIG. 17 shows an example where the Y-coordinate value representing the position of RFID chip is changed from 0 to 100, and the writing time RfTime is behind the writing time for the RFID chip before the positional change by a time corresponding to the increase in distance Rf_YLength (=100).

For a case where the RFID chip is carried on the print medium at an arbitrary position in the width direction of print medium, proper writing can be achieved by moving the RFID reader/writer 5 in the width direction of print medium.

To this end, on the basis of the position data of the original RFID data transmitted from the form layout application program 41, the printer controller 22 transmits a control command to move the position of the RFID reader/writer 5 in the width direction of print medium, whereby the data writing into the RFID chip carried on an arbitrary position as viewed in the width direction of print medium can be realized. The motion of the RFID reader/writer 5 in the width direction of print medium can be easily realized by a combination of a known driving unit such as a linear motor or a pulse motor and an appropriate motion mechanism such as a timing belt or a screw feeder, for instance.

Furthermore, the form layout application program 41 is capable of editing a plurality of pieces of RFID data that are present in the same one page. When a plurality of the RFID chips 25 are carried on the print medium 24 so as to be spaced apart from one another in the width direction of print medium, a plurality of RFID readers/writers 5 are used in order to write the RFID write data into each of the RFID chips.

For example, when two RFID chips 25 are carried on the print medium 24 so as to be spaced apart from each other in the width direction of print medium as shown in FIG. 18, the form layout application program 41 first edits two RFID data frames, and converts pieces of RFID data into PDL data. The printer controller 22 receiving the pieces of RFID data converted into PDL data determines the number of the pieces of RFID data present in the same page, and the position of each RFID data in that page.

In this example, there are two pieces of RFID data having widthwise position information different from each other, and therefore, the printer controller 22 recognizes that there are two pieces of RFID data (two RFID chips 25) in the same page. The writing of two pieces of the RFID data into the two RFID chips 25 can be realized by means of two RFID readers/writers 5, for instance.

Referring to FIG. 18, two RFID chips 25 are carried on the same page of the print page 24. Specifically, a first RFID chip A is carried on a widthwise position represented by an X-coordinate value X1 (for example, 100), whereas a second RFID chip B is carried on a widthwise position represented by an X-coordinate value X2 (for example, 400). The printer controller 22 transmits the RFID write data for the first RFID chip A to a first RFID reader/writer 51 (writer A), and transmits the RFID write data for the second RFID chip B to a second RFID reader/writer 52 (writer B), whereby the RFID data can be written into each of the two RFID chips that are carried on different widthwise positions in the same page of the print medium 24.

The RFID data can also be written into a plurality of RFID chips carried on the same one page of the print medium 24 as viewed in the direction of transfer of the print medium. FIG. 19 shows the flow of data in case that a plurality of, for example, two RFID chips are carried on different positions in the transfer direction of print medium.

As described above, even if the carried position of the RFID chip 25 on the print medium 24 is changed in the transfer direction of the print medium, the data writing into the RFID chip can be carried out by changing the time of data writing into the RFID reader/writer 5 on the basis of the final raster signal transmitted from the printer engine 1. Thus, changing the data writing time makes it possible to perform the data writing into the RFID chip carried on an arbitrary position as viewed in the transfer direction. In other words, it is also possible to write data into a plurality of RFID chips that are carried on different positions in the same one page as viewed in the print-medium transfer direction.

More specifically, in order to perform the data writing, for example, into two RFID chips that are carried on different position in the same page of the print medium as viewed in the print-medium transfer direction, the form layout application program 41 edits two RFID data frames, as in the case of data writing into two RFID chips which are different in widthwise position. The two RFID data frames are juxtaposed in the transfer direction, as shown in FIG. 19.

Next, the form layout application program 41 converts pieces of RFID data into PDL data. When receiving the data, the printer controller 22 determines the number of pieces of RFID data present in one page and positions of these RFID data in that page. In this example, a first RFID chip ABC is carried on the print medium 24 at a transfer-direction position represented by a Y-coordinate value of 100, and a second RFID chip XYZ is carried at a transfer-direction position represented by a Y-coordinate value of 300. Since there are two pieces of RFID data having different information regarding the transfer-direction position as mentioned above, the printer controller 22 understands that two pieces of RFID data are present in the same page.

In accordance with the following formula, each of two RFID write times for one page is calculated based on the position information (Rf_YLength):

$$RfTime = LsTime + P - RLength/PrintSpeed + Rf\_YLength/PrintSpeed.$$

After the RFID write times are calculated, the printer controller 22 writes the RFID write data into the RFID reader/writer 5 with reference to the RFID write times, whereby it is possible to write the RFID data into each of the two RFID chips, the first and second RFID chips ABC, XYZ having different transfer-direction positions.

The foregoing examples show that electronic information can be written into a plurality of RFID chips that are carried on the print medium at different widthwise positions or different transfer-direction positions. This indicates that a combination of the above two methods makes it possible to write the RFID data into each of four RFID chips having different widthwise positions and different transfer-direction positions from one another. In this modification, the explanation has been given for the case where four RFID chips are carried on the same page of the print medium at different widthwise and transfer-direction positions. This invention is also applicable to a case where three or five or more RFID chips are carried on the same page of the print medium.

The RFID chip is enabled to be written with electronic information, without being in contact with the RFID reader/writer 5. Therefore, in case that a plurality of RFID chips are carried on the same one page of the print medium as mentioned above, when the electronic data (RFID data) is written into the RFID chip positioned beneath the RFID reader/writer 5 or in vicinity thereof, there is a fear that the same electronic information can erroneously be written also into an adjacent RFID chip. In the case of a plurality of RFID chips being carried on the same page of the print medium, it is sometimes possible to remove the just-mentioned problem that electronic information can be erroneously written into the adjacent RFID chip, by mounting an electromagnetic shield for shielding a radio wave from the RFID reader/writer between adjacent RFID chips.

In some cases, the above-mentioned problem can be eliminated by the following countermeasure: An additional RFID reader/writer is installed at the paper feed section of the printer engine, and the RFID chip of each RFID tag retains therein an ID that is proper to each RFID chip. The proper ID is read out by means of the additional RFID reader/writer, and the printing information is printed by the printer engine on the print medium of that RFID tag. Subsequently, on the basis of the proper ID, the RFID reader/writer installed at the ejection section of the printer engine specifies the RFID chip to which the data is to be written, whereby each RFID chip can be written only with the RFID data associated therewith.

In the printing system, the RFID data to be written into the RFID tag is edited on the form layout application program 41. The RFID data defined on the form layout application program 41 may not be limited to fixed data. For example, the RFID data may be data that is retained in an external database. Furthermore, the printer controller 22 may refer to data in the database. In this case, the RFID data defined on the form layout application program 41 may be a database address corresponding to the data in the database. For example, an address of database provided in a certain computer on the network 3 is defined as the RFID data by the form layout application program 41.

The printer controller 22, receiving the RFID data having been converted into PDL data, analyzes the RFID data (database address defined on the form layout application program), reads data from a database provided in a certain computer on the network 3, and transmits this data as the RFID data to the RFID reader/writer 5. By doing this, data present in the external database can be written as RFID data into the RFID chip.

According to the just-mentioned method, the RFID data to be written into the RFID tag can be changed simply by changing the database content, without the need of changing the RFID data on the form layout application program 41. Moreover, when the RFID data only includes the database address, the volume of PDL data that is received by the controller can be reduced on an occasion that PDL data, in which the RFID data and the print data are mixedly present, is output from the form layout application program 41 through the printer driver 43.

In the foregoing example, explanation has been given to a case where the database is provided in a certain computer on the network. Alternatively, the database may be provided in a computer in which the form layout application program 41 is executed or a computer that constitutes the printer controller 22.

Further, the printer controller 22 may be adapted to display the RFID data edited by the form layout application program 41. For example, the print data can be analyzed from the PDL data by the printer controller 22, and the video data used for printing by the printer engine 1 can be displayed on the screen of the printer controller 22. The RFID write data can also be displayed on the screen of the printer controller 22.

In order to allow the data to be discriminated, the printing system is arranged to display the video data in black in color and the RFID write data in blue. All the RFID write data can be displayed on the screen of the printer controller 22. However, if the RFID write data is large in data size, part of the RFID write data, for example, data corresponding to the leading five characters, can be displayed. Alternatively, some mark representing that there is the RFID write data may be displayed, and all the RFID write data may be displayed on a different operation screen.

There is a case where the printing is performed in a printing company by using print data that is prepared by a data preparation company, which is different from the printing company, by using the form layout application program 41. In such a case, the print data prepared by the data preparation company is transmitted to the printing company by way of a communication line such as internet or provided in the form of external recording medium such as optical magnetic disk. The printing company receives the print data by means of the printer controller, and performs the printing onto the print medium by using the printer engine.

At that time, there sometimes occurs the following problem. When the position of preprinted ruled lines or specified print frames or RFID chips carried on the print medium is slightly shifted from the intended one, much labor and long time are needed, resulting in inefficiency, since the conventional art cannot enable the printing company to edit the print data. Specifically, in such a case, the printing company is required to contact the data preparation company, and corrections to the printing position or RFID frame position must be made by the data preparation company by using the form layout application program 41.

According to the printing system, the RFID write data can be edited even by means of the printer controller 22. For example, the position information of the RFID write data to be written into the RFID reader/writer can be changed. The printing system of this invention having the just-mentioned function can edit the RFID write data by means of the printer controller 22, without the need of tracing back to the form layout application program 41.

By utilizing such function of the printing system, when carried positions of RFID chips on the print medium, etc. must be changed, data edition can be performed even by the printing company which is different from the data preparation company, whereby the efficiency of printing operation can be improved.

When the RFID chip is damaged for any reasons, electronic information cannot be written into the RFID chip, and in most cases, such damage cannot be found out by simply looking at the RFID chip carried on the print medium. Furthermore, the electronic information already written into the RFID chip cannot be ascertained.

According to the printing system of this invention, the printing system can be stopped in dependence on the written state of RFID data. Specifically, as shown in FIG. 16, after the RFID write data is transmitted to the RFID reader/writer 5, the RFID reader/writer 5 performs RFID-writing acknowledgement signal transmission. The printer controller 22 receives the status (acknowledgement signal) of the RFID reader/writer 5, thereby obtaining information that indicates whether or not the writing of RFID write data has been completed. Therefore, it is possible, for example, to configure the printer controller 22 such that it transmits a control command to stop printing to the printer engine 1 so as to interrupt the printing when the writing of RFID write data is failed. In addition, an error message can be displayed on the screen of the printer controller or of a computer on the network to notify the operator of the printing being stopped.

When there occurs an error, the page of the print medium on which the damaged RFID chip is carried is removed, and then an arbitrary page can be specified on the printer controller 22, without the need of tracing back to the form layout application program 41, whereby the reprinting and the writing of RFID write data into the RFID reader/writer 5 (the writing of RFID data into RFID chip) can be made. Moreover, the print page to be reprinted can be specified by specifying the error page by means of the printer controller 22 or by displaying the print data and the RFID write data on the printer controller 22, as mentioned above.

According to the prior art system in which synchronization between printing and writing of RFID data cannot be achieved, when the RFID chip is damaged so that the writing of RFID data cannot be completed, the page in question must be printed again from the application. In some cases, the consistency cannot be ensured between the print information printed on each page of the print medium after the printing is restarted and the RFID data written into the RFID chip carried on the same page of the print medium. In the printing system of this invention, the consistency between the print data and the RFID data can be ensured even in the reprinting, which is required when the RFID data writing cannot be made due to the RFID chip being damaged.

In the foregoing example, the printing is forcibly stopped when there occurs a writing failure of RFID data into the RFID chip. Alternatively, the printer controller 22 may store the page for which the writing of RFID data into RFID chip (the writing of RFID write data into RFID reader/writer) has been failed, so that the operator can ascertain, during or after completion of the printing, the page for which the data writing failure has been caused. Furthermore, the printing system may be arranged to carry out the rewriting to the page for which data writing failure has been caused, without the need of tracing back to the form layout application program 41. The error information may be saved in a file of the printer controller 22 or the computer on the network.

In the foregoing example, a selection can be made on a menu on the printer controller 22 whether the printing must be stopped or not upon occurrence of data writing failure. Alternatively, such selection may be set on the form layout application program 41, and setting information may be contained in PDL data. By doing this, the operation of the printing system upon occurrence of data writing failure can be selected in advance, without the need of making selection on the menu on the printer controller 22.

On the form layout application program 41, an arbitrary setting information can be converted into PDL data. Therefore, if the format of RFID data written into the RFID tag is to be changed depending on the type of RFID tag, the type of RFID tag may be added to PDL data. As explained previously, the operation or processing of the printer engine and/or the RFID reader/writer can be set on the form layout application program 41, from which the setting is output to the printer controller in the form of PDL data.

At the time of writing the RFID write data by means of the RFID reader/writer 5, the RFID data written into the RFID chip of the RFID tag may be read therefrom, and the read RFID data may be transferred from the RFID reader/writer 5 to the printer controller 22 (RFID read data transmission), as shown in FIG. 16. In addition to information indicating whether or not the data writing has been completed, the printer controller 22 receives the RFID data obtained from the RFID tag, and therefore, the printer controller 22 can verify the RFID data written into the RFID tag.

In some cases, the writing speed of RFID data into the RFID tag is slower than the printing speed of the printing engine 1. The time required for data writing into the RFID tag varies depending on the volume of RFID data. In this regard, the printing speed of the printer engine 1 may be controlled in advance by the printer controller 22 in dependence on the RFID data amount, whereby a writing failure of RFID data can be prevented.

On the basis of the received PDL data, the printer controller 22 can determine an amount of RFID write data to be written into the RFID reader/writer. When the amount of RFID write data is small, the printing speed of the printer engine 1 is maximized to increase the throughput of the printing system. On the other hand, when the amount of RFID write data is large, the printing speed of the printer engine 1 is decreased so that the RFID write data can be written into the RFID reader/writer, whereby a writing failure of RFID write data and hence a writing failure of RFID data into RFID chip can be prevented.

What is claimed is:

1. A printing system, comprising:
   a printer engine for printing print information on at least a print-information recording medium, said print information including at least one of contactlessly readable code information and image information visible to human being;
   an RFID reader/writer for writing RFID data consistent with the print information into an RFID chip carried on the print-information recording medium; and
   a printer controller for supplying print data,
   wherein said printer engine prints the print information on at least the print-information recording medium based on the print data received from said printer controller,
   said RFID reader/writer writes the RFID data consistent with the print data into the RFID chip, and
   the printing of the print information on at least the print-information recording medium based on the print data and the writing of the RFID data consistent with the print data into said RFID chip are controlled based on a common time basis by using information indicative of a time when the printer engine transmits a signal, to the printer controller, each time when a final raster for each page is output by the printer engine.

2. The printing system according to claim 1, wherein said printer engine performs page-based printing, and the common time basis is based on a cycle of the page-based printing of said printer engine.

3. The printing system according to claim 1, further comprising:
   a form layout application program capable of editing both the data and the RFID data.

4. The printing system according to claim 3, wherein at least part of the RFID data is transmitted in the form of PDL data from the form layout application program to said printer controller.

5. The printing system according to claim 3, wherein said printer controller or the form layout application program is capable of recording or displaying information that indicates whether or not said RFID reader/writer can write the RFID data into the RFID chip, and
   the form layout application program is capable of specifying error processing in said printer controller.

6. The printing system according to claim 3, wherein said printer controller or said form layout application program is capable of displaying an edit screen for the print data, and the RFID data can be displayed on the edit screen.

7. The printing system according to claim 3, wherein the form layout application program can specify position information on a location of the RFID data in one page of the print-information recording medium.

8. The printing system according to claim 3, wherein said printer system is capable of referring to a database, and
   an address of the database serving as at least either one of the print data and the RFID data can be edited in the form layout application program.

9. The printing system according to claim 1, wherein said RFID reader/writer is plurality in number, these RFID readers/writers being provided so as to be juxtaposed in a width direction of the print-information recording medium,
   said RFID chip is plurality in number, these RFID chips being carried on the print-information recording medium so as to be juxtaposed in a width direction of the print-information recording medium, each of the RFID readers/writers writes the RFID data into a corresponding one of the RFID chips, and the RFID readers/writers perform writings substantially at the same time.

10. The printing system according to claim 1, wherein said RFID chip is plurality in number, these RFID chips being carried on one page of the print-information recording medium as viewed in a direction of transfer of the recording medium, and said RFID reader/writer sequentially writes the RFID data into each of the RFID chips.

11. The printing system according to claim 1, wherein a printing speed of said printer engine can be changed in accordance with an amount of information of the RFID data.

12. The printing system according to claim 1, wherein the print-information recording medium has a print face adapted to be printed with the print information, and the print face has a level difference, and the print information is printed on a substantially flat portion of the print face, avoiding the level difference.

13. The printing system according to claim 1, wherein the information indicative of a time when the printer engine transmits a signal is a final raster signal transmitted from the printer controller.

* * * * *